US008433674B2

(12) United States Patent
Takata et al.

(10) Patent No.: US 8,433,674 B2
(45) Date of Patent: Apr. 30, 2013

(54) METHOD FOR CLIPPING MIGRATION CANDIDATE FILE IN HIERARCHICAL STORAGE MANAGEMENT SYSTEM

(75) Inventors: Masanori Takata, Yokohama (JP);
Hitoshi Kamei, Sagamihara (JP);
Atsushi Sutoh, Yokohama (JP);
Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 290 days.

(21) Appl. No.: 12/490,053

(22) Filed: Jun. 23, 2009

(65) Prior Publication Data
US 2010/0274826 A1 Oct. 28, 2010

(30) Foreign Application Priority Data

Apr. 23, 2009 (JP) .................................. 2009-104643

(51) Int. Cl.
G06F 17/30 (2006.01)

(52) U.S. Cl.
USPC .......................................... 707/609; 707/688

(58) Field of Classification Search .................. None
See application file for complete search history.

(56) References Cited

U.S. PATENT DOCUMENTS

| 2002/0107877 | A1* | 8/2002 | Whiting et al. | 707/204 |
| 2004/0148444 | A1* | 7/2004 | Thomas et al. | 710/44 |
| 2004/0193760 | A1 | 9/2004 | Matsunami et al. | |
| 2006/0288048 | A1* | 12/2006 | Kamohara et al. | 707/200 |
| 2007/0011420 | A1* | 1/2007 | Boss et al. | 711/165 |
| 2007/0255759 | A1* | 11/2007 | Akelbein et al. | 707/200 |
| 2008/0263277 | A1 | 10/2008 | Matsunami et al. | |
| 2010/0121828 | A1* | 5/2010 | Wang | 707/694 |

FOREIGN PATENT DOCUMENTS

| JP | 2001-101039 A | 4/2001 |
| JP | 2004-295457 A | 10/2004 |
| JP | 2006-216070 A | 8/2006 |

OTHER PUBLICATIONS

U.S. Appl. No. 12/348,339, filed Jan. 5, 2009, Kamei.

\* cited by examiner

*Primary Examiner* — Syed Hasan
(74) *Attorney, Agent, or Firm* — Foley & Lardner LLP

(57) ABSTRACT

The system of the present invention curbs an unnecessary inter-tier file migration and provides an inter-tier file migration that conforms to the utilization state. The hierarchical storage management system respectively migrates a frequently accessed file to the upper Tier, and an infrequently accessed file to the lower Tier. This system carries out inter-tier file migration in conformance with the utilization state. This system provides functions for anchoring a Tier for storage for a specified file, and for not permitting an inter-tier file migration.

20 Claims, 22 Drawing Sheets

FIG.7

304 ANCHOR TABLE

| TIER ID (701) | FILE ID (702) | EXPIRATION DATE (703) |
|---|---|---|
| 1 | V | 2010/01/26 18:00 |
| 1 | W | 2010/02/26 18:00 |
| ... | ... | ... |
| 2 | X | 2010/02/26 18:00 |
| ... | ... | ... |
| 3 | Y | 2010/12/31 24:00 |
| 3 | Z | 2010/12/31 24:00 |
| ... | ... | ... |

FIG.8          800 SETTINGS SCREEN

SETTINGS

FILE MIGRATION CYCLE AND START TIMING

[ Cycle ]

- [✓] DAILY
- [ ] WEEKLY    Select a day of the week ▾
- [ ] MONTHLY   Select a day of the month ▾

[ Start timing ]
0:00

MIGRATION POLICIES

[ TIER 1 ← TIER 2 ]
100 accesses
AND 100 files

[ TIER 2 ← TIER 3 ]
10 accesses
AND 10 files

[ TIER 1 → TIER 2 ]
When remaining capacity below
10 GB,
migrate files which there is no access within
30 days
AND larger than 10 MB,

[ TIER 2 → TIER 3 ]
When remaining capacity below
100 GB,
migrate files which there is no access within
365 days
AND larger than 10 MB,

ANCHOR SETTINGS

Please specify a file, or a set of files:
[_____] Browse...

Expiration date:
2010/02/26 18:00

Select a tier ▾     ADD     DELETE

OK     CANCEL

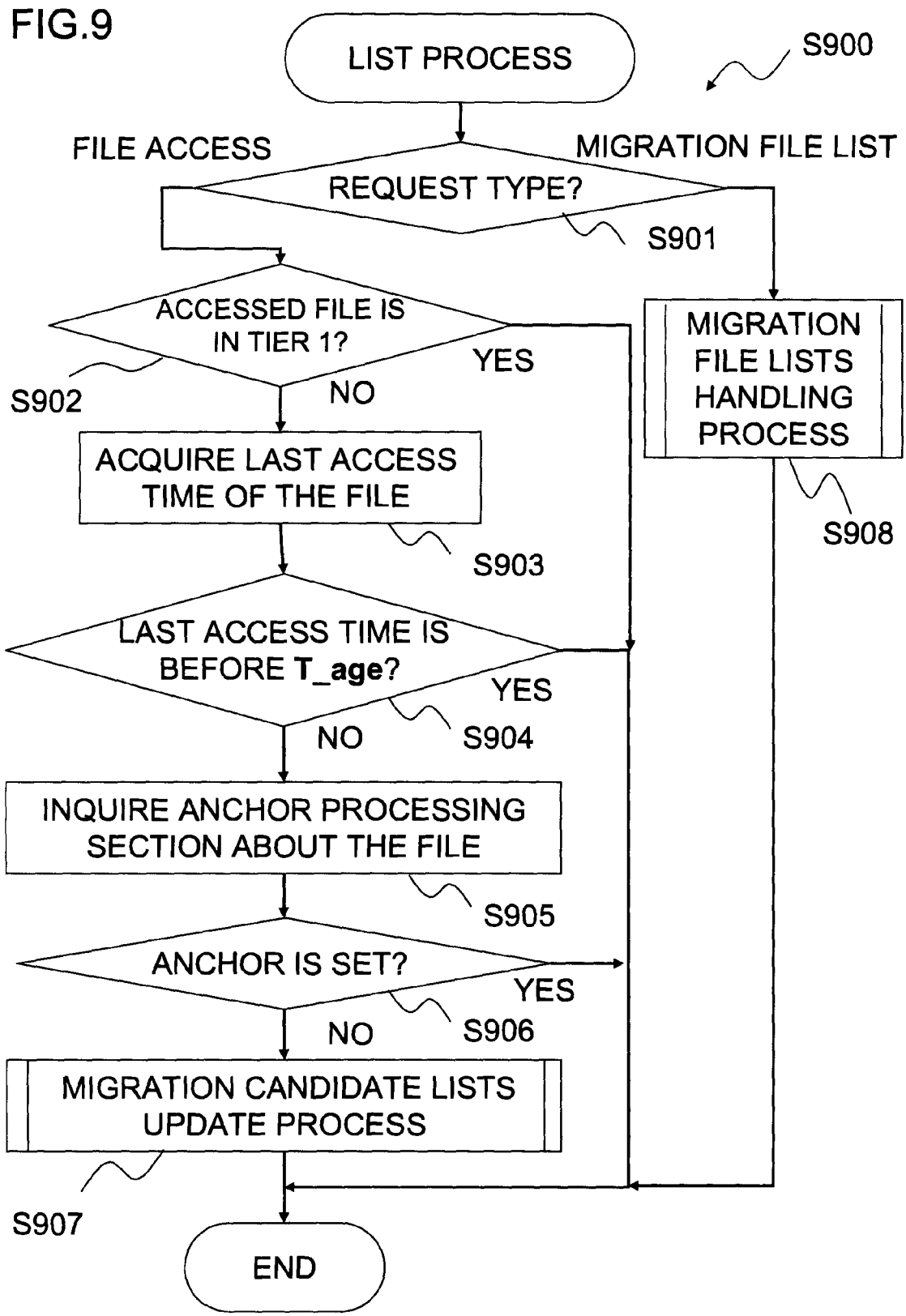

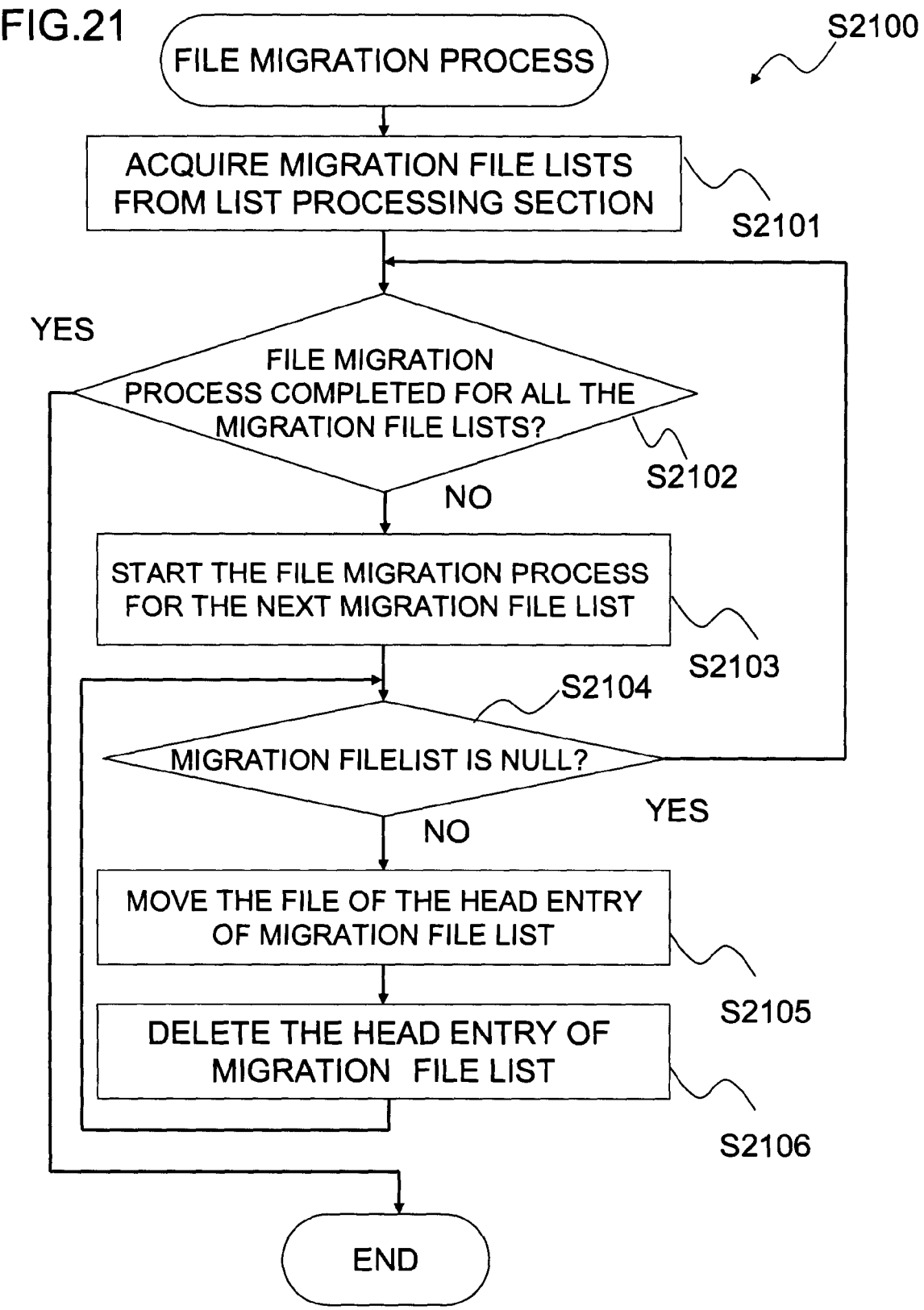

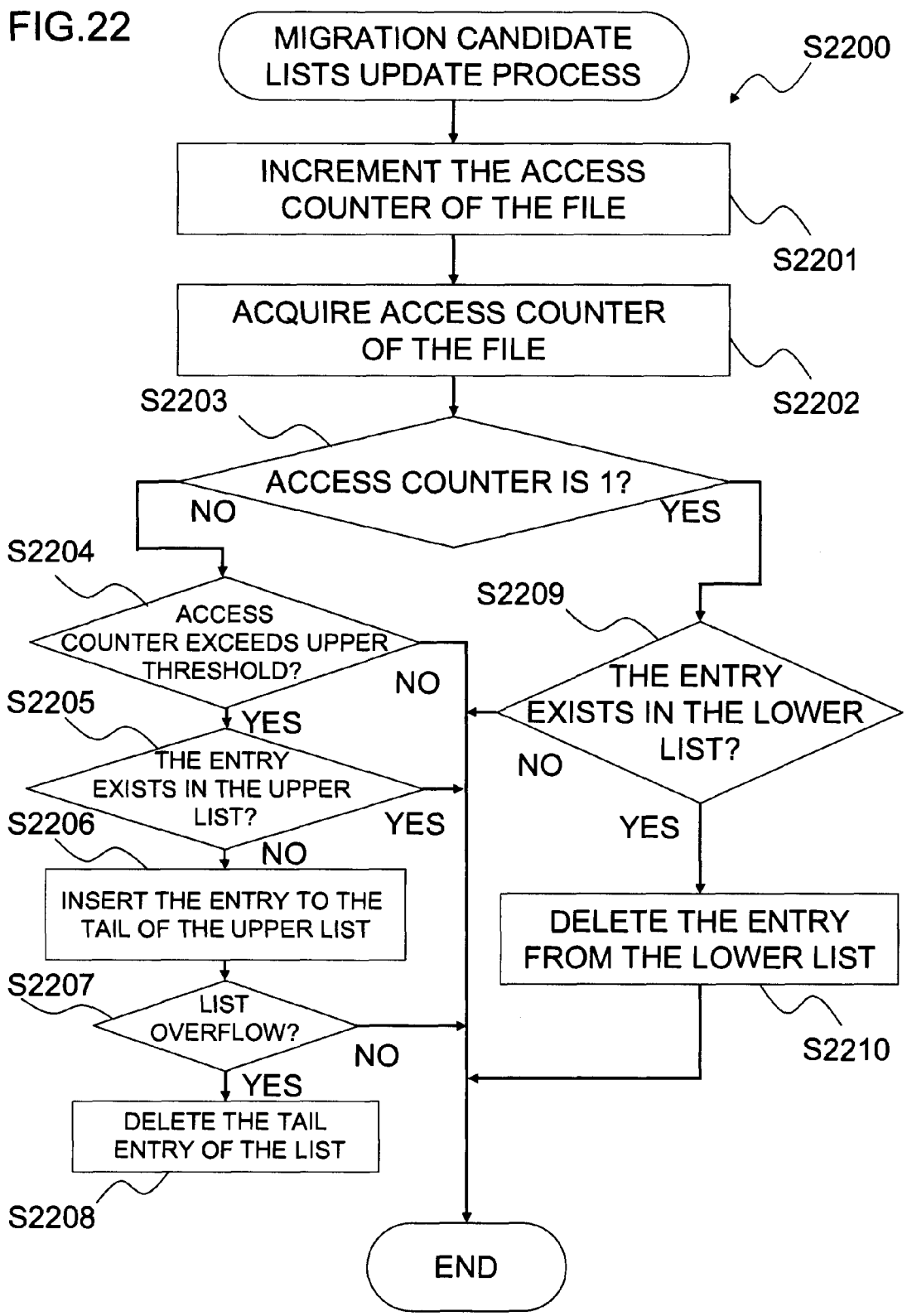

METHOD FOR CLIPPING MIGRATION CANDIDATE FILE IN HIERARCHICAL STORAGE MANAGEMENT SYSTEM

CROSS-REFERENCE TO RELATED APPLICATIONS

This application relates to and claims priority from Japanese Patent Application No. 2009-104643 filed on Apr. 23, 2009, the entire disclosure of which is incorporated herein by reference.

BACKGROUND OF THE INVENTION

1. Field of the Invention

The present invention relates to a hierarchical storage management system, device and program for carrying out inter-tier file migration that conforms to the way files are used.

2. Description of the Related Art

Hierarchical storage management (HSM) technology configures a plurality of file systems that is in storage systems with different functions and performance as a single file system, and migrates files between the file systems in accordance with the way the files are utilized.

Arranging a file that is accessed with high frequency in an upper Tier (a file system featuring high performance and bit costs) and arranging a file that is accessed with low frequency in a lower Tier (a file system featuring low performance and bit costs) reduces costs without lowering the performance of the system as a whole.

A patent document (2004/0193760 A1) discloses technology for exercising control so as to store file data in any of a plurality of storage areas in accordance with the file characteristics.

A patent document (JP-A-2001-101039) discloses technology for executing an inter-tier file migration from the upper Tier to the lower Tier when a file, which satisfies a certain set condition, i.e. a last file access time, a last file update time or a file size, is retrieved as a migration file, and this migration file satisfies a condition in which a remaining capacity has been set. In addition, the patent document (JP-A-2001-101039) also discloses technology by which a user application expressly specifies an inter-tier file migration by changing a file attribute, and the migration is executed at the time of the attribute change.

In the prior art, the problem is that an unnecessary file migration is carried out from the lower Tier to the upper Tier, delaying file access and straining the capacity of the upper Tier.

In a conventional HSM system, in a case where a lower-tier file is accessed even one time, this file is migrated to the upper Tier. In a conventional system, an unnecessary file migration to Tier 1 puts a strain on the capacity of Tier 1, and generates an I/O in line therewith. An unnecessary file migration is the migration of a low access frequency file, such as a file that a client opened by mistake, or a file that was opened during a file search.

With regard to this, the patent document (2004/0193760 A1) discloses a technology for carrying out an inter-tier file migration in accordance with the life cycle of the file. A file access count and other such statistical access information is held, but there is no disclosure as to a technology for utilizing the statistical access information in an inter-tier file migration.

Another problem with the prior art is that a file that is not meant to be migrated gets migrated.

In a case where the clipping of all migration candidate files is carried out based on a set condition, files, which were not supposed to be migrated, are migrated. These include files that are not desirable to migrate to the lower Tier, such as, for example, an important file, or a file for which a short response time is required, and files that are not desirable to migrate to the upper Tier, such as, for example, a large size file.

The patent document JP-A-2001-101039 discloses technology by which a user application expressly specifies an inter-tier file migration by changing a file attribute, and the migration is executed when the attribute changes. However, the problem is that in a case where the user application frequently issues migration instructions, inter-tier file migrations are carried out frequently and access performance declines. Another problem is that in a case where the user application does not issue a migration instruction very often, an inter-tier file migration is not carried out until the remaining capacity of the Tier drops to the set value, resulting in frequently accessed files not being migrated to the upper Tier and infrequently accessed files remaining in the upper Tier.

SUMMARY OF THE INVENTION

To solve for at least one of the above-mentioned problems, an object of the hierarchical storage management system of the present invention is to provide functions for migrating frequently accessed files to the upper Tier and migrating infrequently accessed files to the lower Tier, and in accordance with this, regularly carrying out inter-tier file migrations that conform to the way files are used.

Also, to solve for at least one of the above-mentioned problems, another object of the hierarchical storage management system of the present invention is to provide a functions for anchoring a Tier in which a specified file is stored to this specified file and for not permitting an inter-tier file migration.

BRIEF DESCRIPTION OF THE DRAWINGS

FIG. 7 is a diagram showing the structure of an anchor table;

FIG. 8 is a diagram showing a settings screen used when the administrator is operating the file sharing server;

FIG. 9 is a flowchart showing a list process in accordance with a list processing section related to the first embodiment;

FIG. 21 is a flowchart showing a file migration process in accordance with a file migration control section relate to the second embodiment; and FIG. 22 is a flowchart showing a migration candidate lists update process in accordance with the list processing section related to the second embodiment.

DESCRIPTION OF THE PREFERRED EMBODIMENTS

The present invention will be explained below based on the drawings.

Embodiment 1

Figure 1:
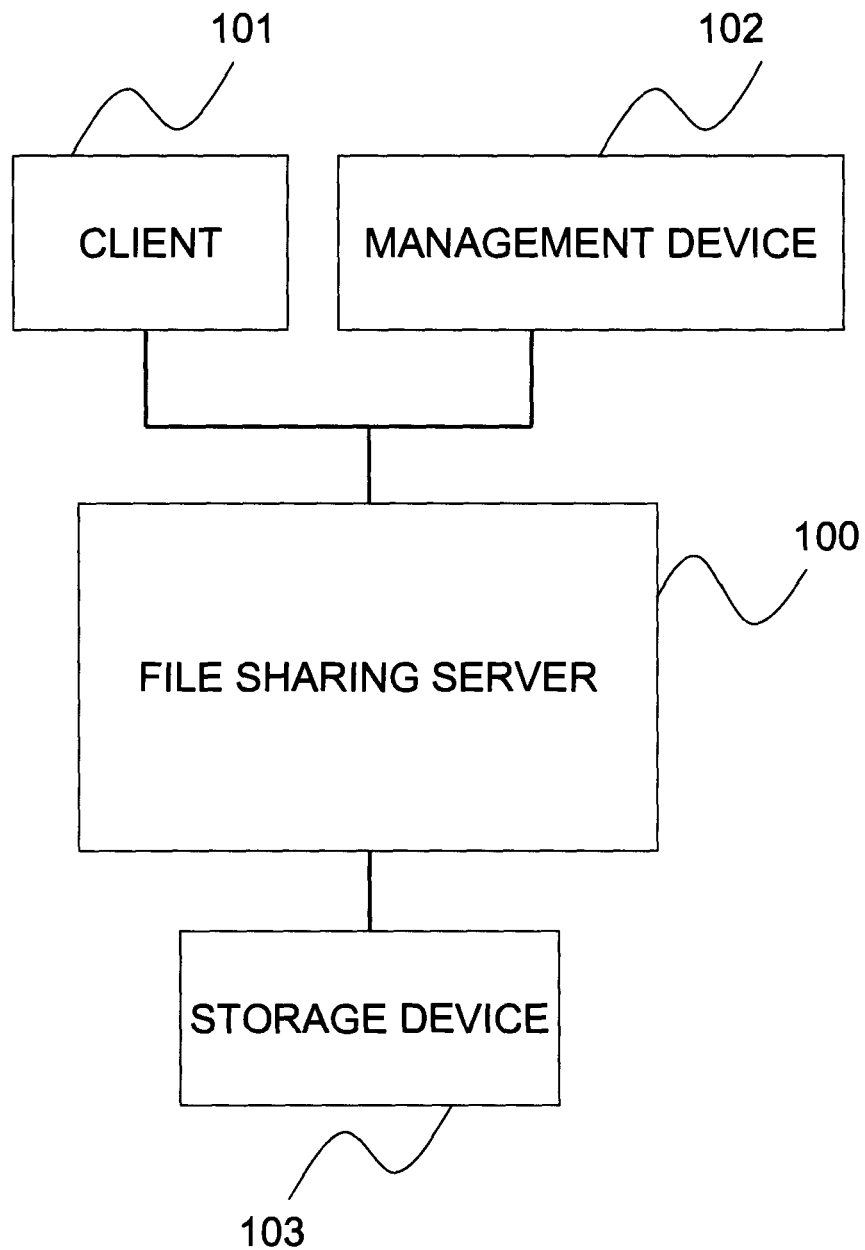
FIG. 1 is a diagram showing an example of the configuration of a hierarchical storage management system of the present invention.

FIG. 1 is a block diagram showing an example of the configuration of a hierarchical storage management system to which the present invention has been applied. Hereinafter, the letter x will express an arbitrary positive integer.

The hierarchical storage management system has a file sharing server 100; a storage device 103 that is connected to the file sharing server 100; a management device 102; and either one or a plurality of clients 101 (client computer). The file sharing server 100 and storage device 103 are connected via a SAN (Storage Area Network). Also, the file sharing server 100, management device 102 and client 101 are connected via a LAN (Local Area Network).

The management device 102 is a computer that the administrator uses to manage the file sharing server 100. The administrator operates the file sharing server 100 from the management device 102 via the LAN. The client 101 is either one or a plurality of computers that uses a file sharing service provided by the file sharing server 100. A user, who utilizes the client 101, uses the file sharing service provided by the file sharing server 100 by making use of a file sharing protocol, such as NFS (Network File System) or CIFS (Common Internet File System).

Figure 2:
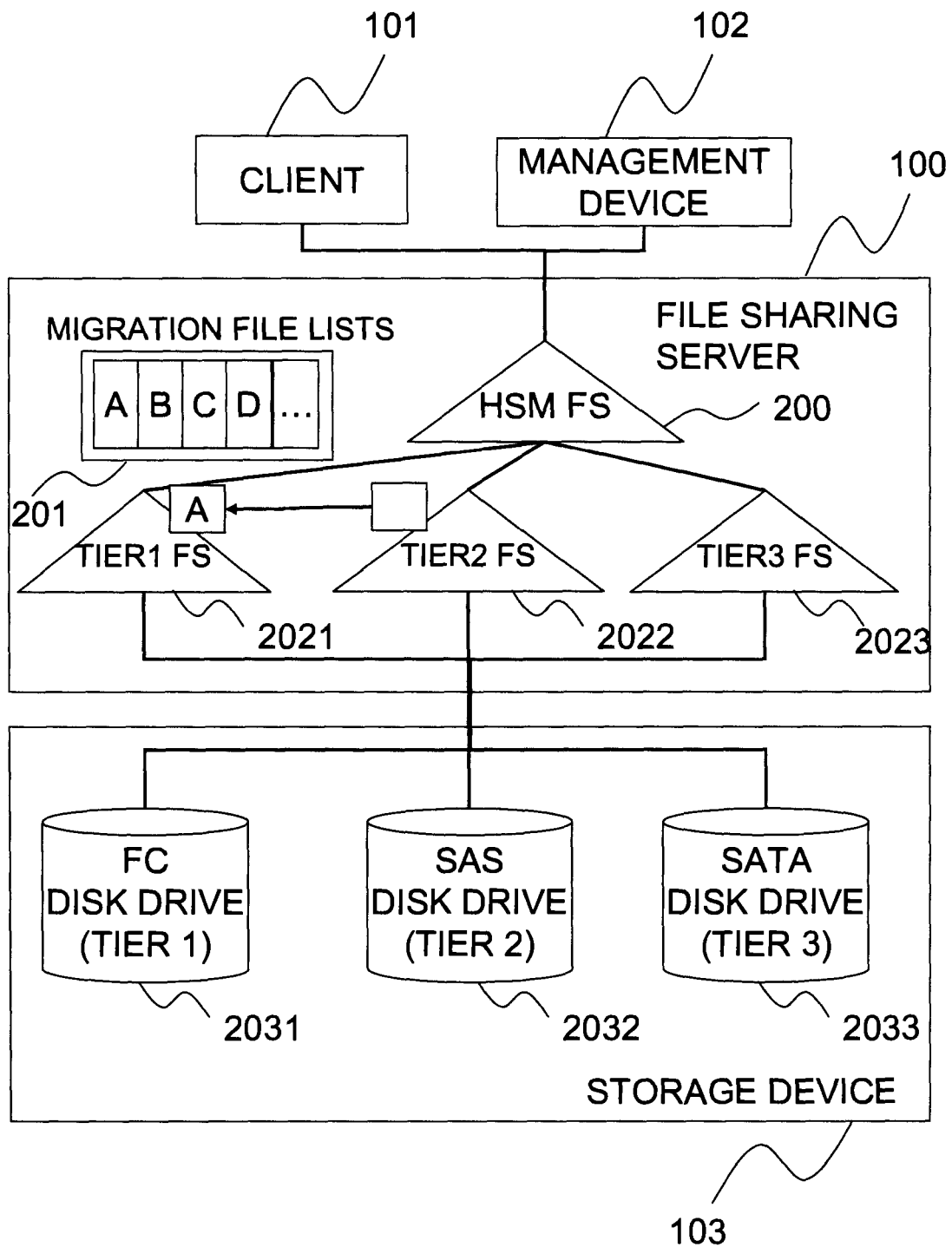
FIG. 2 is an outline diagram of the hierarchical storage management system of the present invention.

FIG. 2 is a conceptual diagram of a hierarchical storage management system to which the present invention has been applied. The hierarchical storage management system of the present invention will be explained using an example that comprises a plurality of different types of disk drives 203x, and these disk drives 203x differ in terms of performance and characteristics. In this embodiment, a FC (Fibre Channel) disk drive 2031 comprises a FC-type interface, a SAS (Serial Attached SCSI) disk drive 2032 comprises a SAS-type interface, and a SATA (Serial Advanced Technology Attachment) disk drive 2033 comprises a SATA-type interface. These disk drives 203x provide volumes to the file sharing server 100.

Performance increases in the order of the FC disk drive 2031, the SAS disk drive 2032, and the SATA disk drive 2033, and the Tiers are configured such that performance becomes higher the higher the upper Tier volume. That is, the FC disk drive 2031 configures the Tier 1 volume, the SAS disk drive 2032 configures the Tier 2 volume, and the SATA disk drive 2033 configures the Tier 3 volume.

The file sharing server 100 creates file systems 202x on volumes provided by the storage device 103. A Tier 1 file system 2021 is created on the Tier 1 volume provided by the FC disk drive 2031, a Tier 2 file system 2022 is created on the Tier 2 volume provided by the SAS disk drive 2032, and a Tier 3 file system is created on the Tier 3 volume 2023 provided by the SATA disk drive 2033.

These file systems 202x hold user-created client 101 data in a file format. Hereinafter, these file systems 202x that configure the Tiers in the hierarchical storage management system may be called real file systems 202x.

Meanwhile, an HSM file system 200 is configured on top of the plurality of real file systems 202x, making the plurality of real file systems 202x hierarchical and providing a function for managing these real file systems 202x.

FIG. 2 shows an example in which a file A, which is in the Tier 2 file system 2022 in this configuration, is migrated to the Tier 1 file system 2021. Migration file lists 201 are created in each Tier, and an inter-tier file migration is executed on the basis of the migration file lists 201. The migration file lists 201 show the files, of the migration candidate lists 306 shown in FIG. 6, for which inter-tier file migrations will be executed.

Figure 3:
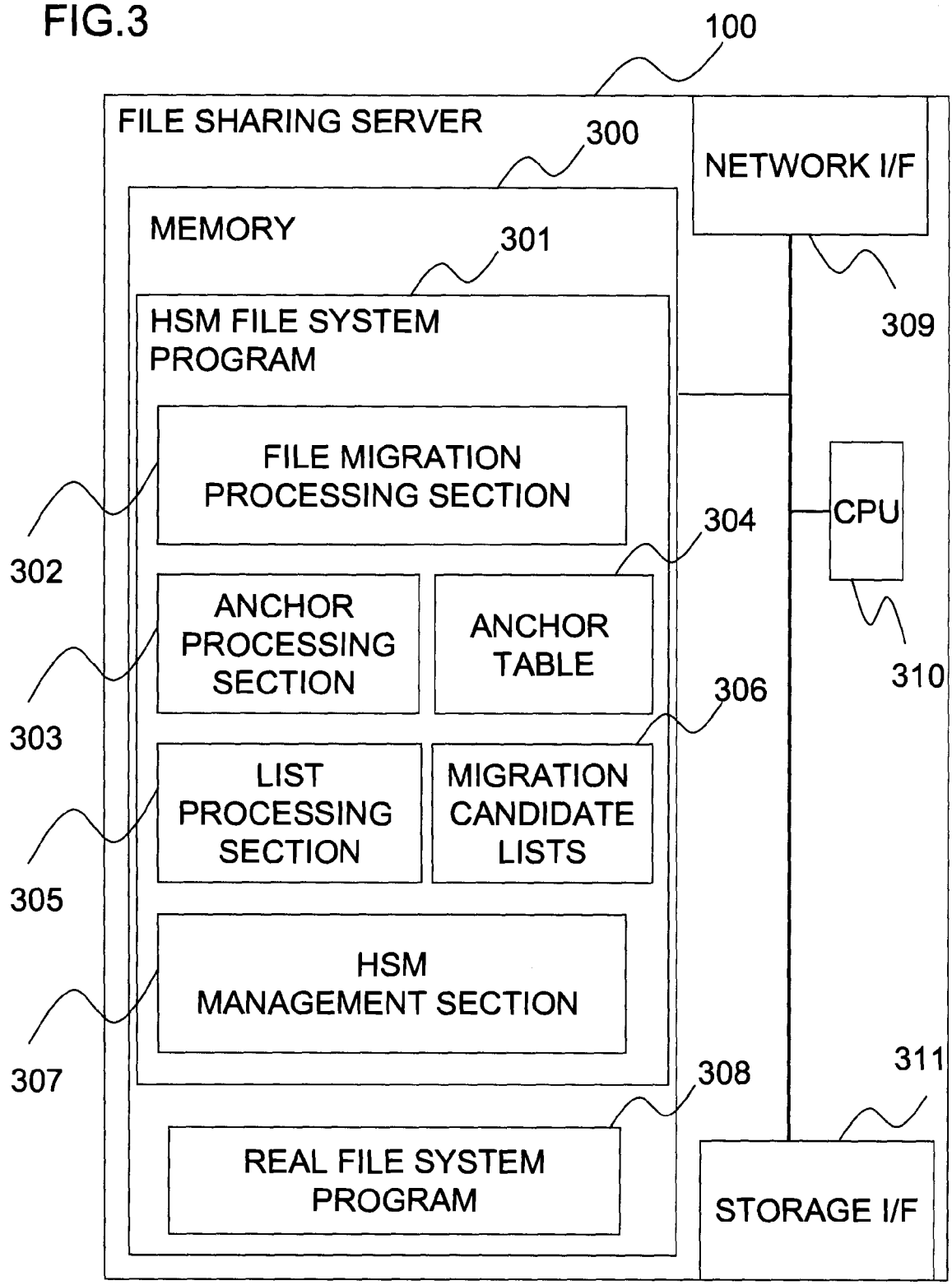
FIG. 3 is a diagram showing the hardware and software configurations of a file sharing server.

FIG. 3 shows an example of the configuration of the file sharing server 100. The file sharing server 100 is a computer equipped with a CPU 310 for executing the programs stored in a memory 300, a storage interface 311 that is used in communications with the storage device 103, a network interface 309 that is used in communications with the management device 102 and the client 101, and the memory 300 for storing programs and data, and these components are connected via an internal communication channel (for example, a path).

In the memory 300, there are stored a HSM file system program 301 and a real file system program 308. The HSM file system program 301 realizes hierarchical storage management and inter-tier file migration. The HSM file system program 301 is configured from a file migration control section 302, an anchor processing section 303, an anchor table 304, a list processing section 305, migration candidate lists 306, and a HSM management section 307. Although not shown in the drawing, the migration file lists 201 are one part of the migration candidate lists 306.

A list showing the files for which an inter-tier file migration is to be executed is created inside the migration candidate lists 306 as migration file lists 201 at the start of a file migration. The created migration file lists 201 are temporarily stored in the memory 300 of the file sharing server 100.

The HSM management section 307 constructs the HSM file system 200 and provides HSM functions. Furthermore, although not shown in the drawing, an operating system is stored in the memory 300.

Figure 4:
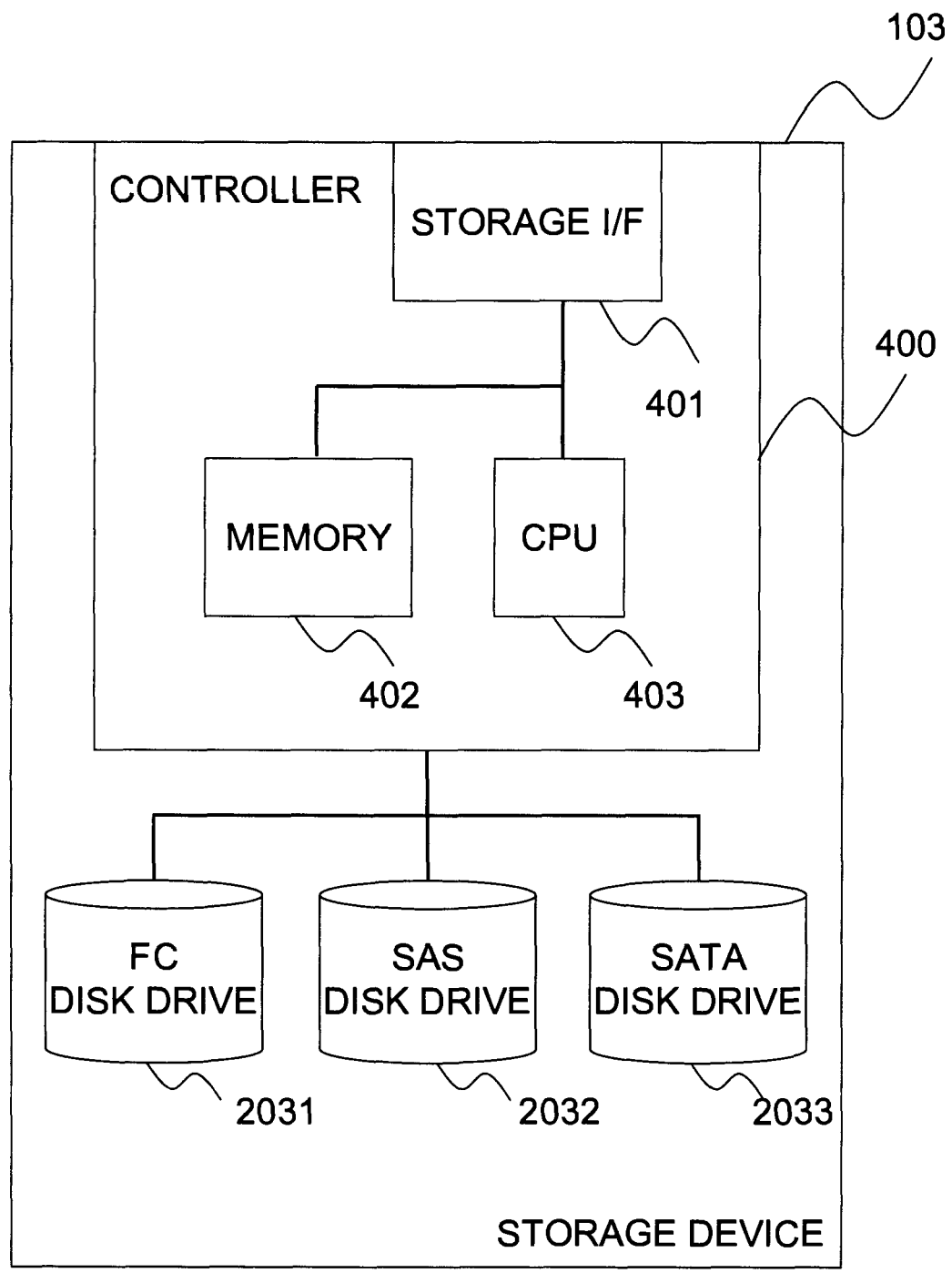
FIG. 4 is a diagram showing the hardware configuration of a storage device.

FIG. 4 shows an example of the configuration of the storage device 103. The storage device 103 has a controller 400, and one or a plurality of disk drives 203x. The controller 400 is equipped with a storage interface 401, a memory 402, and a CPU 403, and these elements are connected via an internal communication channel. The controller 400 and disk drives 203x are also connected via an internal communication channel.

Figure 5:
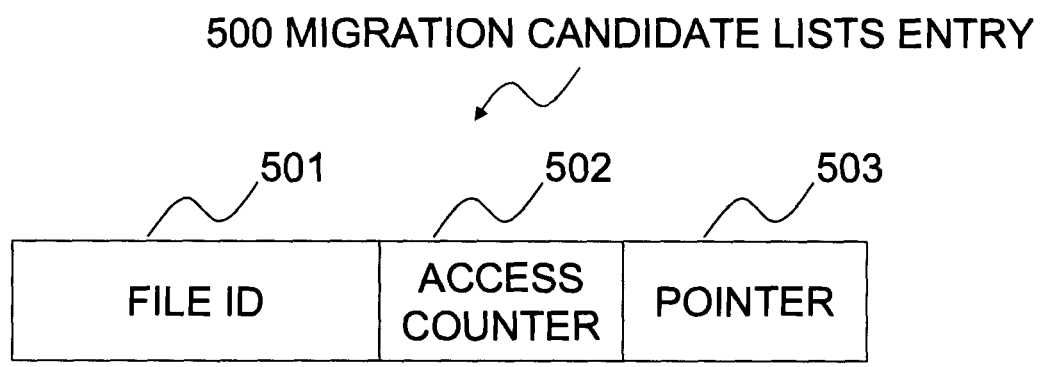
FIG. 5 is a diagram showing a data structure of the entry of migration candidate lists.

FIG. 5 shows the structure of one entry of the migration candidate lists 306. An entry of the migration candidate lists 306 is configured from a file identifier 501, an access counter 502, and a pointer 503. One entry of the migration candidate lists 306 corresponds to one file.

Figure 6:
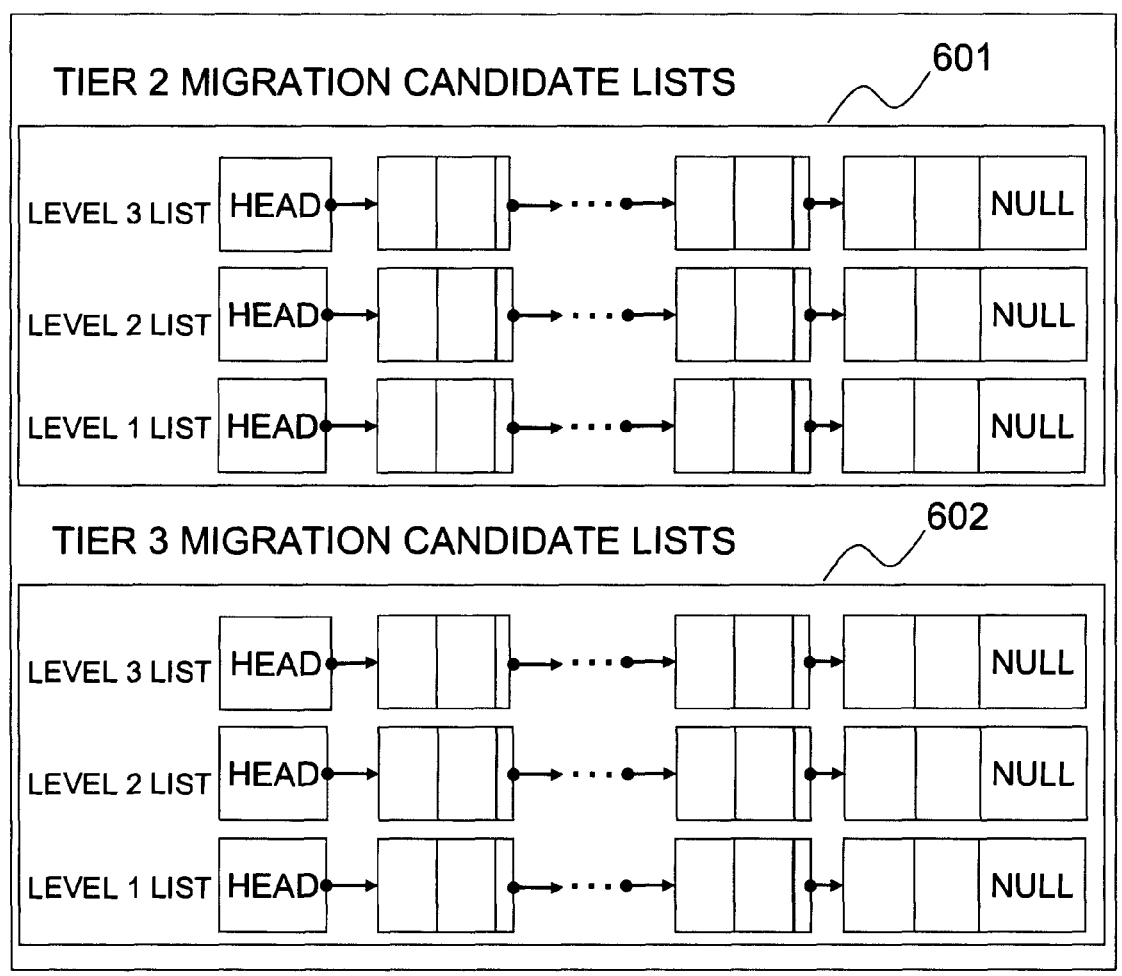
FIG. 6 is a diagram showing the structure of migration candidate lists related to a first embodiment.

FIG. 6 shows an example of the structure of the migration candidate lists 306, which are stored in the memory 300 of the file sharing server 100 in the first embodiment. The migration candidate lists 306 record the number of accesses of an accessed file. The migration candidate files 306 are prepared for each Tier with the exception of the highest Tier. In this embodiment, the migration candidate lists 306 are used only for file migrations from the lower Tier to the upper Tier, and as such, there are no migration candidate lists 306 in the highest Tier.

The migration candidate lists 306 of each Tier are configured from lists of a plurality of levels. The level of the list in which an entry is stored is determined by the value of the access counter 502. In this embodiment, three levels will be explained, but the number of levels will differ in accordance with the migration policies of the administrator. The higher the level of the list, the larger the value of the access counter 502 for storing an entry. A maximum number of entries is determined for each level list. This is because restricting the size of the list at each level curbs the memory capacity consumed by the migration candidate lists 306. The range of the access counter 502 value for the list of the highest level, as will be explained further below, is larger than the policy setting value of the number of accesses set by the administrator, and the size of the list is the number of migration files set by the administrator. There can be either one or a plurality of the other low level lists, and the range of the access counter 502 value for the entries stored therein is at least 2, which is less than the policy setting value of the access frequency set by the administrator, and is a range that does not overlap between levels. Furthermore, the value of the access counter 502 will be explained as the number of file accesses hereinbelow, but this value may also be the access frequency of the file.

The list at each level possesses a pointer (head) denoting the head entry. Each entry pointer 503 denotes the subsequent entry. The pointer 503 at the tail entry of the list denotes NULL (empty). As will be explained further below, when a file in which an entry that is stored in the migration candidate lists 306 is accessed, this entry is migrated to the tail, thereby performing sorting in order from the tail of the list so that the time of the last access constitutes the recent entry.

Furthermore, the same thing can be realized in a case where every time a file for which an entry is stored in the migration candidate lists 306 is accessed, this entry is migrated to the head, and sorting is performed in order from the head of the list so that the time of the last access constitutes the recent entry.

FIG. 7 is a diagram showing an example of the anchor table 304, which is stored in the memory 300 of the file sharing server 100. The present invention provides functions (hereinafter called the anchor functions) for anchoring a Tier in which a specified file is stored to the specified file, and for not permitting an inter-tier file migration. As will be explained further below, the administrator is provided with an interface that makes it possible to set an anchor to a file, and the administrator sets the anchor.

The anchor table 304 holds a file identifier 702 for which the anchor is set, a Tier identifier 701 that denotes the save-destination Tier of this file, and an expiration date 703 of the set anchor.

Furthermore, in this embodiment, the file to which the anchor is set is recorded in accordance with the anchor table, but as another mode, it is possible to add the anchor setting attribute to file meta-information.

This anchor function enables the administrator to place migration restrictions on a specified file, making it possible for the administrator to prohibit the migration of a file that he does not want migrated.

FIG. 8 shows a settings screen 800 of the management device 102. From this settings screen 800, the administrator carries out an inter-tier file migration operation. From the settings screen 800, the administrator is able to set the file migration cycle, the start time, the file migration policy for each Tier, and the anchor settings. Although not shown in the drawing, an entry period of validity setting for the migration candidate lists 306 is also provided on the settings screen 800. In accordance with this migration candidate lists 306 entry period of validity, an entry for a file that has not been accessed during the period of validity is deleted from the migration candidate lists 306. Furthermore, since the migration candidate lists 306 entry period of validity must be longer than the file migration cycle, if an entry period of validity that is shorter than the migration cycle is set, a warning is displayed and a reset is requested.

The setting details of the settings screen 800 and the corresponding processing of the present invention will be explained below using the example of FIG. 8. Since "DAILY" has been selected as the file migration cycle, and "0:00" has been set as the file migration start time, file migration is started at "0:00" every day. At this time, the file migration control section 302 boots up the file migration process from the lower Tier to the upper Tier, and an inter-tier file migration is carried out based on the migration file lists 201 created by the list processing section 305 for each Tier. Because the administrator is able to set the timing for carrying out an inter-tier file migration, an inter-tier file migration may be carried out during a time period when the system load is low, such as the middle of the night.

As the file migration policy from Tier 2 to Tier 1, "100 accesses and 100 files" is set. This signifies that, of the files stored in Tier 2, those migration candidate lists 306 files for which the access counter 502 value is 100 or more are targeted for migration, and that the number of files to be migrated is 100. Migration candidate lists 306 for each Tier are held in the list processing section 305. The entry of an accessed file is stored in the migration candidate lists 306, and the value of the access counter 502 is incremented each time the file is accessed. The range of the access counter 502 values for the lists in the highest level of Tier 2 is 100 or more, and the maximum number of entries for the lists is 100. At file migration execution, the lists of this highest level of Tier 2 constitute the migration file lists 201, and 100 of the files having an access counter 502 value of 100 or more are migrated from Tier 2 to Tier 1. The same process is also carried out for a file migration from Tier 3 to Tier 2.

As the file migration policy from Tier 1 to Tier 2, "When remaining capacity below 10 GB, migrate files which there is no access within 30 days and larger than 10 MB" is set. The HSM management section 307 monitors the remaining capacity of the Tiers, and when the remaining capacity of Tier 1 falls below 10 GB, the file migration control section 302 invokes the process for migrating files from the upper Tier to the lower Tier. This process searches for files stored in Tier 1, and migrates files, which satisfy the policy "not accessed within 30 days and larger than 10 MB" and for which there is no anchor setting to Tier 2 until the remaining capacity of Tier 1 is 10 GB or more. The same process is also carried out for a file migration from Tier 2 to Tier 3. Furthermore, in this embodiment, OR may also be set in the access frequency and file size migration policies.

In the anchor settings, the file to which the anchor is set, the Tier in which this file is stored, and the expiration date of this anchor are set. The set anchor is stored in the anchor table 304 by the anchor processing section 303.

FIG. 9 is a flowchart showing the list process in accordance with the list processing section 305. The list process carries out either a migration candidate lists 306 update process or a migration file lists handling process.

The migration candidate lists 306 update process is invoked by the HSM management section 307 every time a file is accessed. The migration file lists handling process is invoked from the file migration control section 302 at the file migration cycle set by the administrator.

For convenience sake, a value (time) achieved by subtracting the valid period of the entry in the migration candidate lists 306 from the current time will be designated T_age.

The process shown in FIG. 9 will be explained below in accordance with the step numbers.

(Step S901) The list processing section 305 determines the type of request that has been invoked.

(Step S902) In a case where the type of request invoked is a file access request from the HSM management section 307 (Step S901: file access), the list processing section 305 determines whether or not the access-requested file is stored in Tier 1. When the access-requested file is stored in Tier 1 (Step S902: YES), the list process ends.

(Step S903) Conversely, in a case where the access-requested file is not stored in Tier 1 (Step S902: NO), the list processing section 305 acquires the last access time of the access-requested file from the file meta-information of the HSM file system 200.

(Step S904) In a case where the last access time of the access-requested file is compared against the T_age, and the last access time is before the T_age (Step S904: YES), the list process ends.

(Step S905) Conversely, in a case where the last access time is after the T_age (Step S904: NO), the list processing section 305 queries the anchor processing section 303 as to whether or not an anchor setting has been made to the access-requested file.

(Step S906) In a case where an anchor has been set to the access-requested file (Step S905: YES), the list process ends.

(Step S907) Conversely, in a case where an anchor has not been set to the access-requested file (Step S906: NO), the list processing section 305 carries out the migration candidate lists update process, which will be explained further below, and ends the series of processes.

(Step S908) In a case where the type of the invoked request is a migration file lists requests from the file migration control section 302 (Step S901: migration file lists), the list processing section 305 carries out the migration file lists handling process, which will be explained further below, and ends the list process. Furthermore, the last access time acquired in Step S903 is one previous access time updated in accordance with the previous file access and does not reflect the file access request in question. Further, the HSM management section 307 updates the last access time of the file in question subsequent to the end of the list process by the list processing section 305.

Figure 10:
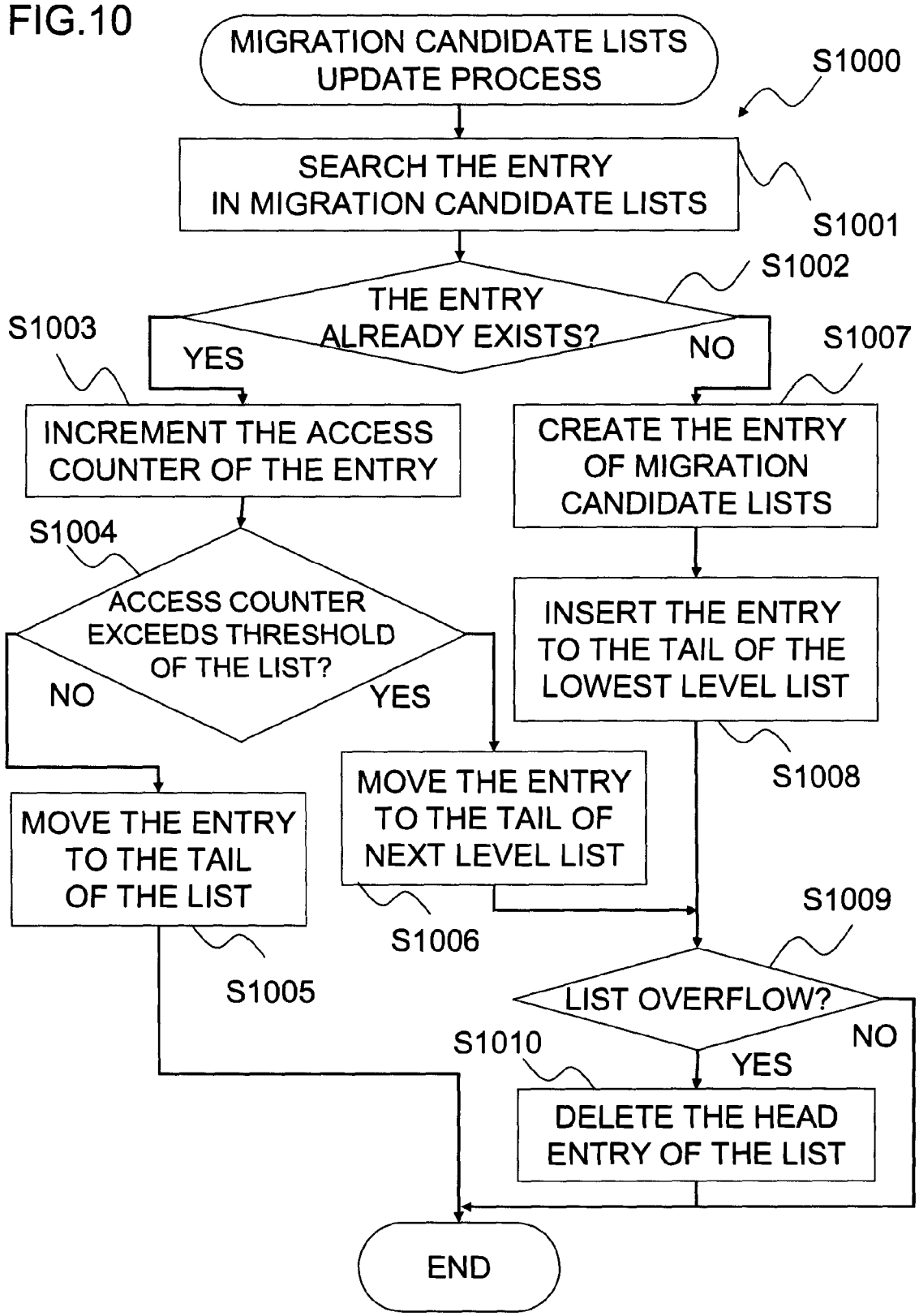
FIG. 10 is a flowchart showing a migration candidate lists update process in accordance with the list processing section related to the first embodiment.

FIG. 10 is a flowchart showing a migration candidate lists update process in accordance with the list processing section 305. The migration candidate lists update process is the process in Step S907 of FIG. 9, and is for inserting or updating the entry of an accessed file in the migration candidate lists 306.

The process shown in FIG. 10 will be explained below in accordance with the step numbers.

(Step S1001) The list processing section 305 searches for the entry of the access-requested file that is stored in the migration candidate lists 306.

(Step S1002) The list processing section 305 determines whether or not the entry of the access-requested file is stored in the migration candidate lists 306.

(Step S1003) In a case where the entry of the access-requested file is stored in the migration candidate lists 306 (Step S1002: YES), the list processing section 305 increments the value of the access counter 502 of this entry.

(Step S1004) The list processing section 305 determines whether or not the value of the access counter 502 of this entry exceeds the threshold of the list of the level in which it is currently stored.

(Step S1005) If the value of the access counter 502 of this entry does not exceed the threshold of the list of the level in which it is currently stored (Step S1004: NO), the list processing section 305 appends this entry at the tail of the list and ends the migration candidate lists update process.

(Step S1006) If the value of the access counter 502 of this entry exceeds the threshold of the list of the level in which it is currently stored (Step S1004: YES), the list processing section 305 moves this entry to the tail of the upper level list, and moves to Step S1009.

(Step S1007) In a case where the entry of the access-requested file is not stored in the migration candidate lists 306 (Step S1002: NO), the list processing section 305 creates the entry for this file, and sets the value of the access counter 502 to 2.

(Step S1008) The list processing section 305 adds the entry created in Step S1007 to the tail of the lowest level list.

(Step S1009) The list processing section 305 determines whether or not the list is overflowing. If the list is not overflowing (Step S1009: NO), the list processing section 305 ends the migration candidate lists update process.

(Step S1010) Conversely, if the list is overflowing (Step S1009: YES), the list processing section 305 deletes the entry at the head of this list, and ends the series of processes.

Figure 11:
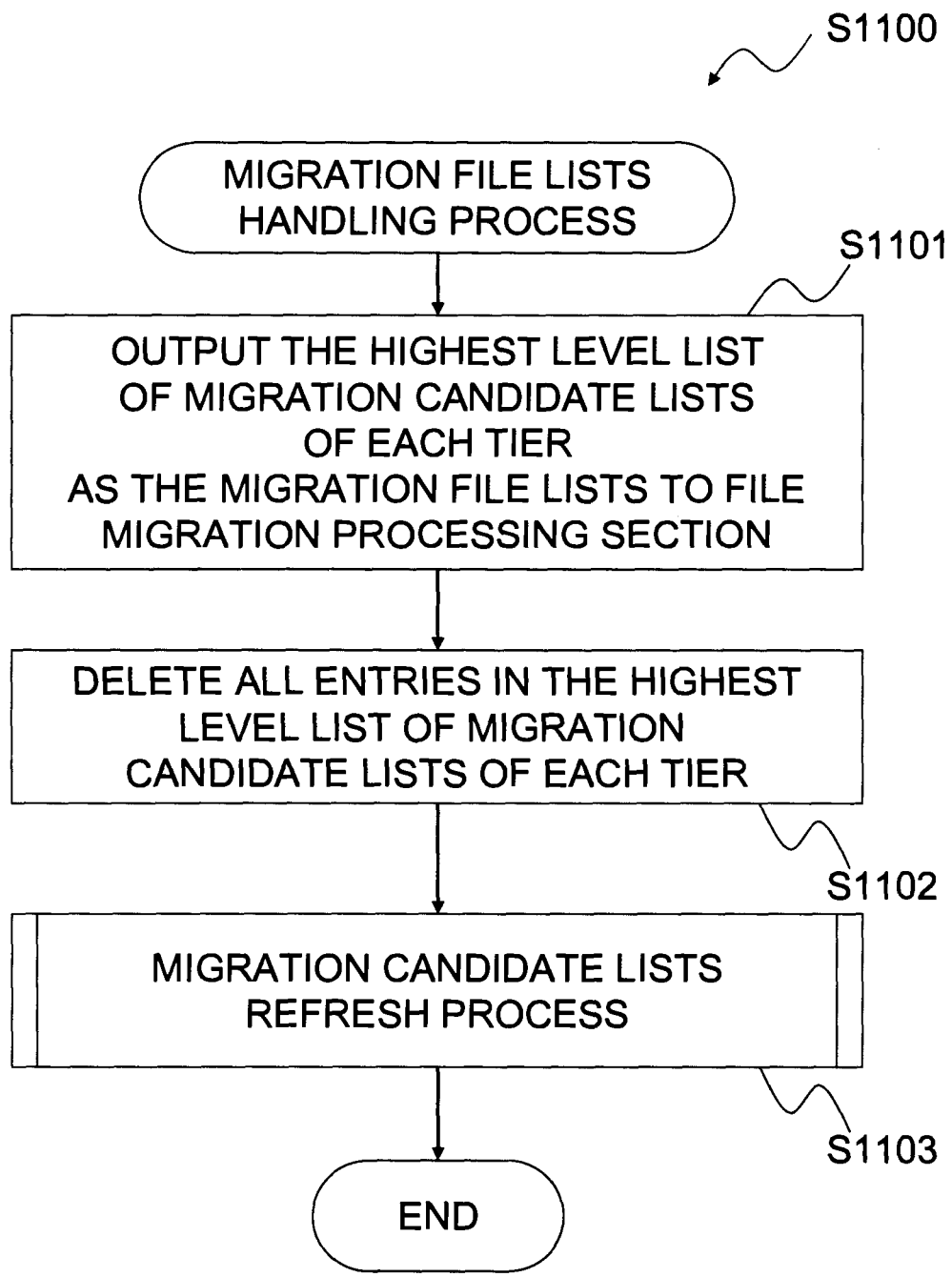
FIG. 11 is a flowchart showing the migration file lists handling process in accordance with the list processing section related to the first embodiment.

FIG. 11 is a flowchart showing the migration file lists handling process in accordance with the list processing section 305. The migration file lists handling process is the process of Step S908 of FIG. 9, and creates the migration file lists 201 and delivers these lists 201 to the file migration control section 302.

The process shown in FIG. 11 will be explained below in accordance with the step numbers.

(Step S1101) The list processing section 305 delivers the highest level list of the migration candidate lists 306 of each Tier to the file migration control section 302 as the migration file lists 201.

(Step 1102) The list processing section 305 deletes (initializes) all the entries in the highest level list of the migration candidate lists 306 of each Tier.

(Step S1103) The list processing section 305 carries out a migration candidate lists refresh process, which will be explained below, and ends the migration file lists handling process.

Figure 12:
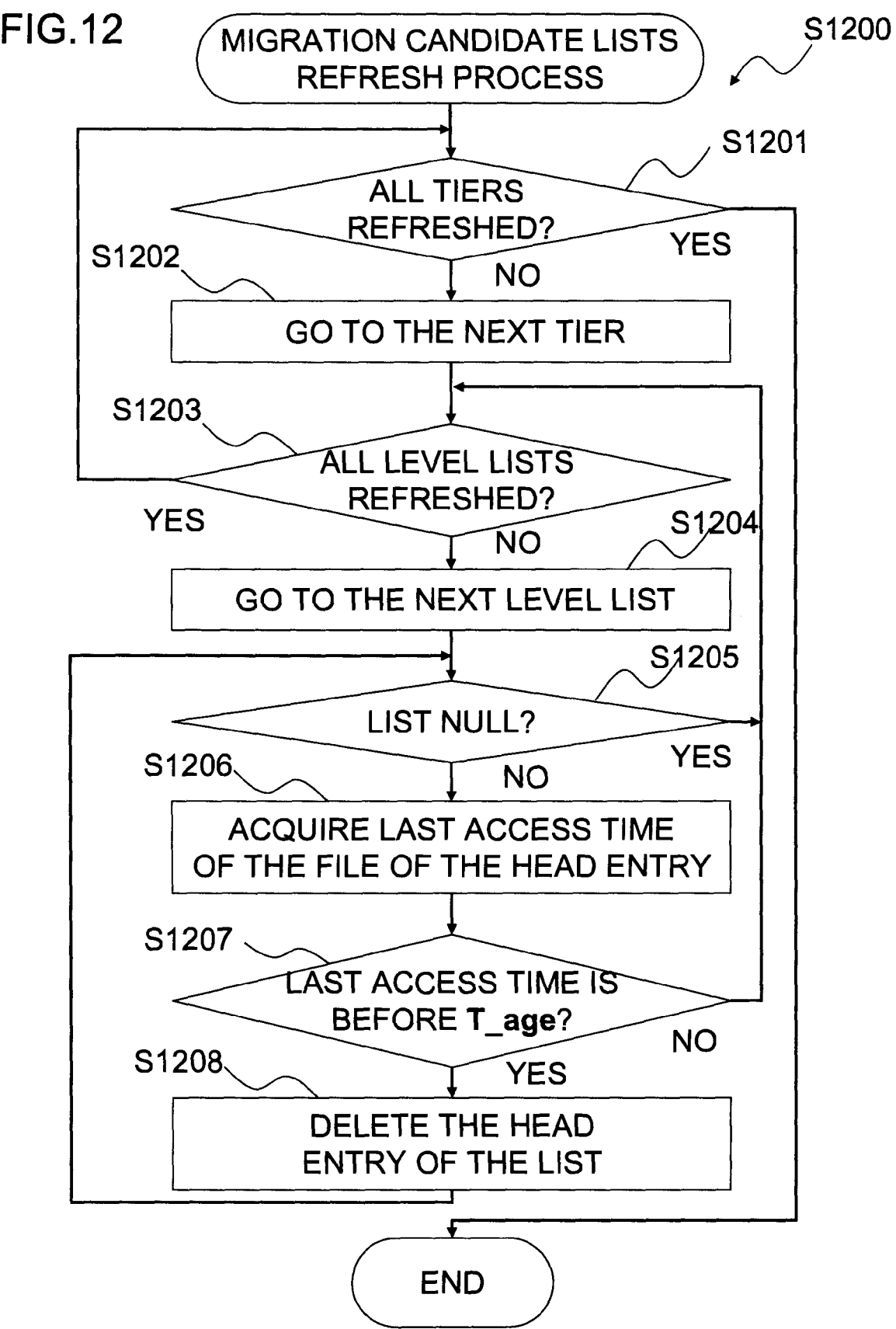
FIG. 12 is a flowchart showing a migration candidate lists refresh process in accordance with the list processing section related to the first embodiment.

FIG. 12 is a flowchart showing the migration candidate lists refresh process in accordance with the list processing section 305. The migration candidate lists refresh process is the process of Step S1103 of FIG. 11, and, of the entries of the migration candidate lists 306 of all the Tiers, deletes from the list an entry having a lapsed entry period of validity.

The process shown in FIG. 12 will be explained below in accordance with the step numbers.

(Step S1201) The list processing section 305 determines whether or not refresh processing has been completed for all the Tiers of the migration candidate lists 306. In a case where refresh processing has been completed for all the Tiers of migration candidate lists 306 (Step S1201: YES), the list processing section 305 ends the migration candidate lists refresh process.

(Step S1202) Conversely, in a case where refresh processing has not been completed for all the Tiers of migration candidate lists 306 (Step S1201: NO), the list processing section 305 proceeds to the refresh processing of the next Tier of migration candidate lists 306.

(Step S1203) The list processing section 305 determines whether or not refresh processing has been completed for all the migration candidate lists of the Tiers currently being processed. In a case where refresh processing has been completed for all the migration candidate lists of the Tiers currently being processed (Step S1203: YES), the list processing section 305 moves to Step S1201.

(Step S1204) Conversely, in a case where refresh processing has not been completed for all the migration candidate lists of the Tiers currently being processed (Step S1203: NO), the list processing section 305 moves to the refresh processing for the next level of migration candidate lists.

(Step S1205) The list processing section 305 determines whether or not the migration candidate list currently being processed is NULL. In a case where the migration candidate list currently being processed is NULL (Step S1205: YES), the list processing section 305 moves to Step S1203.

(Step S1206) Conversely, in a case where the migration candidate list currently being processed is not NULL (Step S1205: NO), the list processing section 305 acquires the last access time of the file of the entry located at the head of the migration candidate list from the file meta-information held by the HSM file system 200.

(Step S1207) The list processing section 305 compares the last access time of the file of the entry currently being processed against the T_age, and when the last access time is after the T_age (Step S1207: NO), moves to Step S1203.

(Step S1208) Conversely, when the last access time is before the T_age (Step S1207: YES), the list processing section 305 deletes the entry at the head of the migration candidate list and moves to Step S1205.

Figure 13:
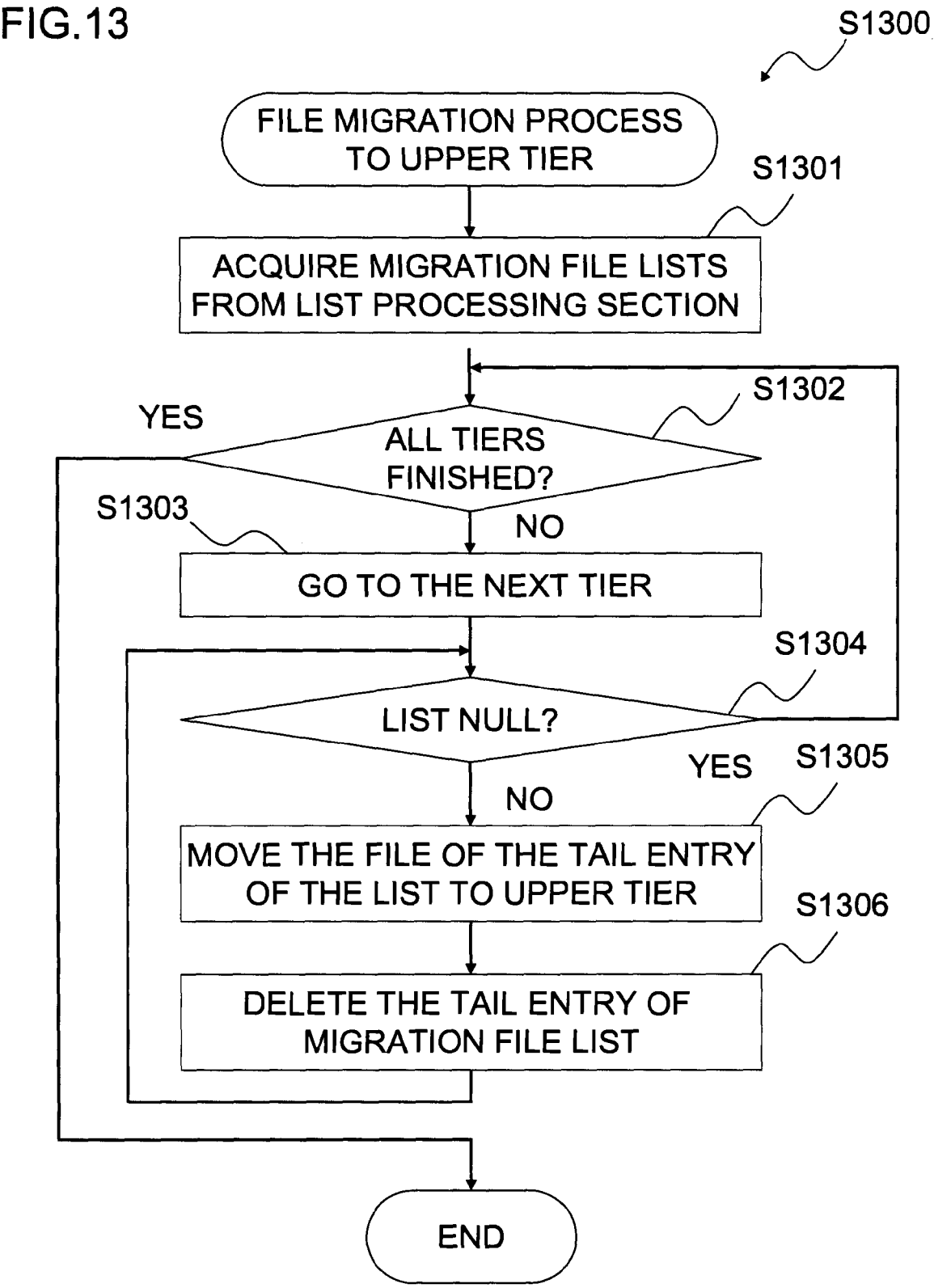
FIG. 13 is a flowchart showing a file migration process from the lower Tier to the upper Tier in accordance with a file migration control section related to the first embodiment.

FIG. 13 is a flowchart showing a file migration process from the lower Tier to the upper Tier in accordance with the file migration control section 302. The file migration process from the lower Tier to the upper Tier is invoked by an OS timer process in accordance with the file migration cycle and timing set by the administrator, and carries out an inter-tier file migration based on the migration file lists 201 acquired from the list processing section 305.

The process shown in FIG. 13 will explained below in accordance with the step numbers.

(Step S1301) The file migration control section 302 requests and receives the migration file lists 201 from the list processing section 305.

(Step S1302) The file migration control section 302 determines whether or not file migration processing has ended for all Tiers (with the exception of the lowest Tier). In a case where file migration processing has ended for all Tiers (Step S1302: YES), the file migration control section 302 ends the file migration process.

(Step S1303) Conversely, in a case where file migration processing has not ended for all Tiers (Step S1302: NO), the file migration control section 302 moves to the file migration processing of the next Tier.

(Step S1304) The file migration control section 302 determines whether or not the migration file list 201 currently being processed is NULL. In a case where the migration file list 201 currently being processed is NULL (Step S1304: YES), the file migration control section 302 moves to Step S1302.

(Step S1305) Conversely, in a case where the migration file list 201 currently being processed is not NULL (Step S1304: NO), the file migration control section 302 migrates the file of the tail entry of the migration file list 201 to the upper Tier.

(Step S1306) The file migration control section 302 deletes the tail entry of the migration file list 201, and moves to Step S1304.

Furthermore, in this embodiment, an inter-tier migration is executed from the file of the tail entry of the migration file list 201 in the file migration process from the lower Tier to the upper Tier, but it is possible to realize the same effect even in a case where an inter-tier migration is executed from the file of the head entry of the migration file list 201.

In this embodiment, the file migration process from the lower Tier to the upper Tier is regularly invoked by the OS in accordance with the file migration cycle and timing set by the administrator, and inter-tier migrations of files having entries in the migration file lists 201 are carried out simultaneously, but there may be cases where it is desirable to immediately migrate a file with an extremely high access frequency to the upper Tier. It is possible to carry out an inter-tier file migration at the timing at which the file is accessed and the value of the access counter 502 exceeds a certain threshold. The threshold of the access counter 502 at this time is set by the administrator from the settings screen 800. Consequently, although file access is delayed during the execution of the file migration, the timing of the inter-tier migrations for the file that has an extremely high access frequency is hastened, making it possible to speed up post-file migration access.

Figure 14:
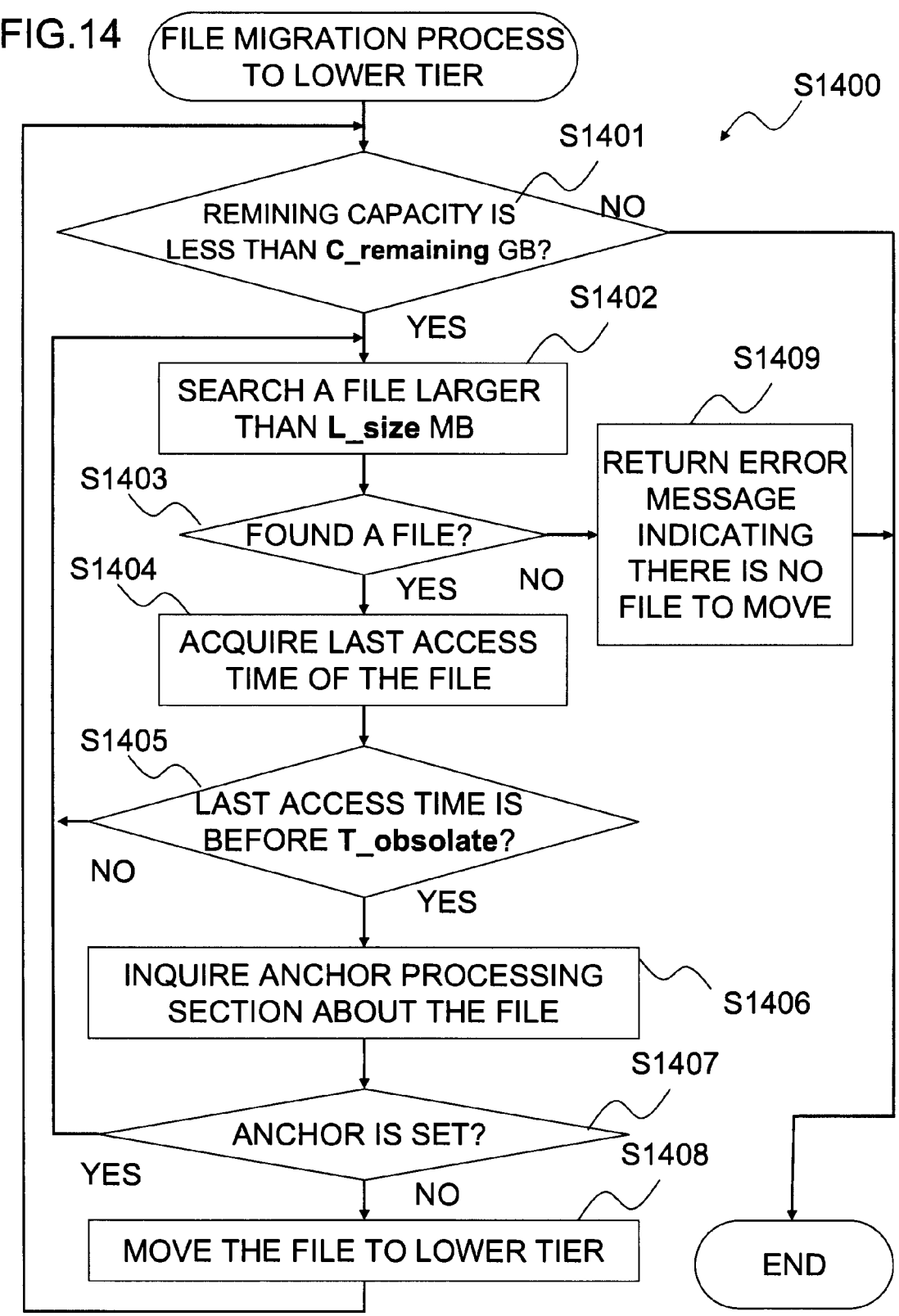
FIG. 14 is a flowchart showing a file migration process from the upper Tier to the lower Tier in accordance with the file migration control section related to the first embodiment.

FIG. 14 is a flowchart showing a file migration process from the upper Tier to the lower Tier in accordance with the file migration control section 302. This process is invoked from the HSM management section 307 when the remaining capacity of the Tier falls below a set threshold, and an inter-tier migration is carried out for a file that has not been accessed recently until the remaining capacity of this Tier becomes greater than the set threshold.

Hereinafter, for convenience sake, the setting value of the remaining capacity, which is the trigger for executing a file migration from the upper Tier to the lower Tier, will be designated C_remaining. Further, the value obtained by subtracting the threshold of the time of the policy for migrating files from the upper Tier to the lower Tier, which is set by the file migration policies for each Tier, from the current time will be designated T_obsolete, and the threshold of the file size will be designated L_size.

The process shown in FIG. 14 will be explained below in accordance with the step numbers.

(Step S1401) The file migration control section 302 determines whether or not the remaining capacity of this Tier has fallen below C_remaining. In a case where the remaining capacity of this Tier has not fallen below C_remaining (Step S1401: NO), the file migration process ends.

(Step S1402) Conversely, in a case where the remaining capacity of this Tier has fallen below C_remaining (Step S1401: YES), the file migration control section 302 searches inside this Tier for one file that is larger than the file size-set threshold L_size. Although not described in FIG. 14, a found file for which the processing of the next and subsequent steps has ended is omitted from this search.

(Step S1403) The file migration control section 302 determines whether or not a file that is larger than the file size-set threshold was found inside this Tier as a result of Step S1402.

(Step S1404) In a case where a file that is larger than the file size-set threshold exists (Step S1403: YES), the file migration control section 302 acquires the last access time of this file from the file meta-information held in the HSM file system 200.

(Step S1405) In a case where the last access time of the file acquired in Step S1404 is compared against the T_obsolete, and the last access time is after the T_obsolete (Step S1405: NO), the file migration control section 302 moves to Step S1402.

(Step S1406) Conversely, in a case where the last access time is before the T_obsolete (Step S1405: YES), the file migration control section 302 queries the anchor processing section 303 as to whether or not an anchor has been set to this file.

(Step S1407) In a case where an anchor has been set to the file (Step S1407: YES), the file migration control section 302 moves to Step S1402.

(Step S1408) Conversely, in a case where an anchor has not been set to the file (Step S1407: NO), the file migration control section 302 migrates this file to the lower Tier and moves to Step S1401.

(Step S1409) In a case where a file larger than the file size-set threshold L_size was not found inside this Tier as a result of Step S1403 (Step S1403: NO), the file migration control section 302 returns an error message and ends the file migration process.

Furthermore, the error message returned in Step S1409 is outputted to the management device 102, the administrator changes the various setting values via the settings screen 800, and a file migration process from the upper Tier to the lower Tier is invoked once again from the HSM management section 307.

Consequently, it is possible to secure a fixed amount of free capacity for the storage area of the files migrated from the lower Tier and the storage area of newly created files.

Figure 15:
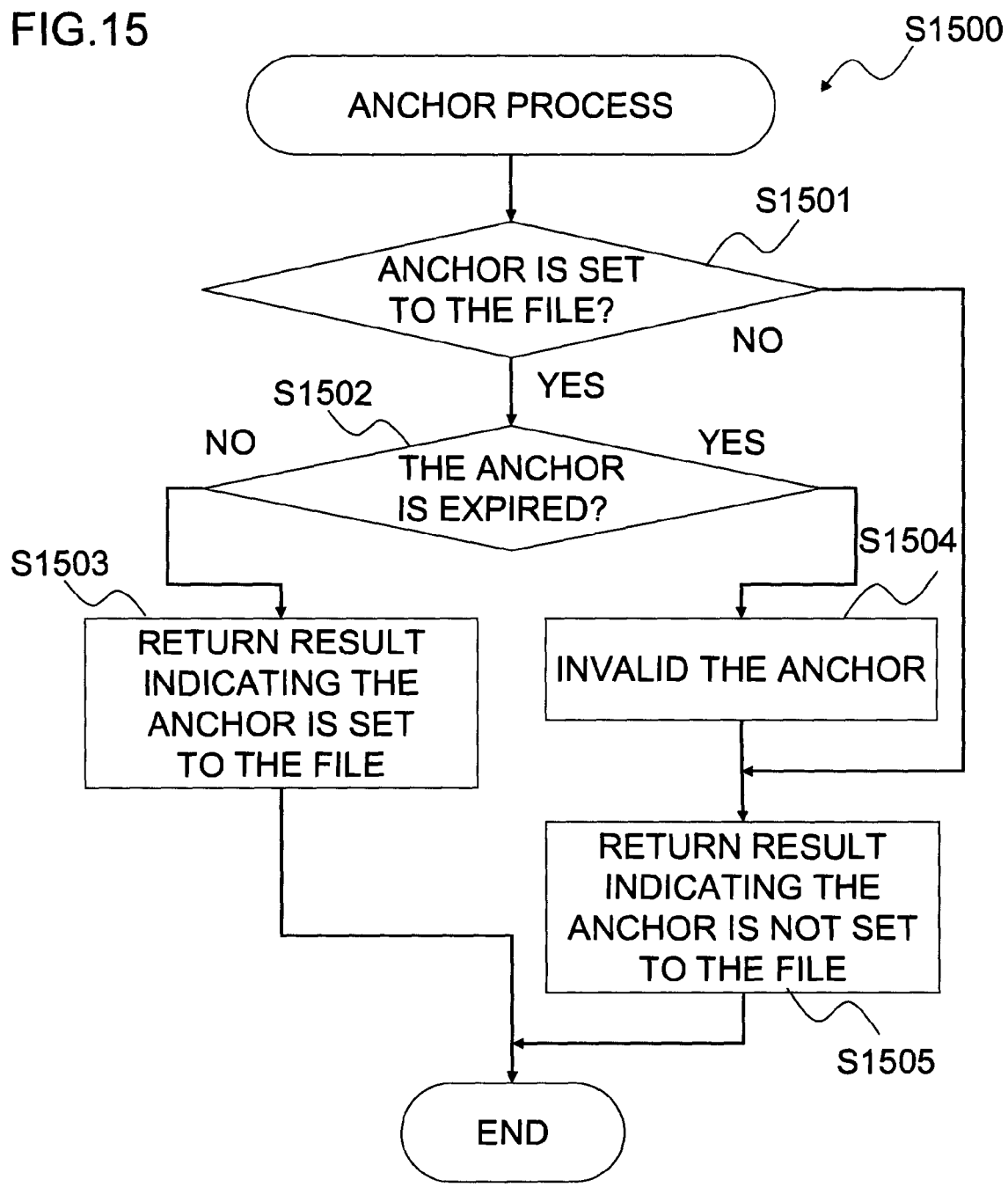
FIG. 15 is a flowchart showing an anchor process in accordance with an anchor processing section.

FIG. 15 is a flowchart showing the anchor process in accordance with the anchor processing section 303. The anchor process is invoked by either the list processing section 305 or the file migration control section 302, and information as to whether or not an anchor has been set to the requested file is returned to the invocation source.

The process shown in FIG. 15 will be explained below in accordance with the step numbers.

(Step S1501) The anchor processing section 303 determines whether or not an anchor has been set to the requested file. In a case where an anchor has not been set (Step S1501: NO), the anchor processing section 303 moves to Step S1505.

(Step S1502) In a case where an anchor has been set to this file (Step S1501: YES), the anchor processing section 303 determines whether or not the expiration time of this anchor has lapsed.

(Step S1503) In a case where the expiration time of the anchor has not elapsed (Step S1502: NO), the anchor processing section 303 returns as a result information to the effect that an anchor has been set to the requested file and ends the anchor process.

(Step S1504) Conversely, in a case where the anchor expiration time has elapsed (Step S1502: YES), the anchor processing section 303 invalidates this anchor.

(Step S1505) The anchor processing section 303 returns as a result information to the effect that an anchor is not set to the requested file and ends the anchor process.

As explained hereinabove, this first embodiment curbs the I/O accompanying list creation by retaining migration candidate lists 306 in each Tier except the highest Tier, and maintaining only the entry of the accessed lower Tier file in the list. Further, setting an upper limit on the size of the migration candidate lists 306 reduces the amount of memory consumed by the migration candidate lists 306. These effects are especially effective when there are a huge number of files.

Furthermore, in this embodiment, the explanation used an example in which there was a list in each Tier, but instead this embodiment may also take the form in which there is information that is used to sort the files in each Tier in order according to number of accesses.

Embodiment 2

A second embodiment will be explained next. The second embodiment differs from the first embodiment in that the migration of files from the lower Tier to the upper Tier, as well as the migration of files from the upper Tier to the lower Tier are carried out regularly on the basis of access frequency. That is, in addition to clipping frequently accessed files and migrating these files from the lower Tier to the upper Tier, the second embodiment also clips infrequently accessed files and migrates these files from the upper Tier to the lower Tier. In accordance with this change, it is possible to carry out file migrations in both directions (from the upper Tier to the lower Tier, and from the lower Tier to the upper Tier) in conformance with the way the files are being used.

The administrator, using the settings screen 800, sets the migration candidate files construction cycle and construction start time, the file migration cycle and migration start time, the file migration policies for each Tier, and the anchor settings. The administrator sets as file migration policies a threshold for number of accesses and a number of migration files that determine migrations to the upper and lower Tiers. Furthermore, the threshold for the number of accesses, which determines a migration from Tier 1 to Tier 2, must be smaller than the threshold for the number of accesses, which determines a migration from Tier 2 to Tier 1. The same holds true for migrations between Tier 2 and Tier 3. This is because frequently accessed files are stored in the upper Tier, and infrequently accessed files are stored in the lower Tier, and if a setting that fails to satisfy this policy is made, a warning is displayed and a reset is requested.

Because the number of file accesses is maintained in the second embodiment, an access counter is added to the file meta-information, and the access counter is incremented each time there is a file access.

Among the system components of this embodiment, the ones explained in FIGS. 1 through 5, FIG. 7 and FIG. 15 are shared in common with the first embodiment. The components in the second embodiment that differ from those in the first embodiment will be explained in detail below using the drawings.

Figure 16:
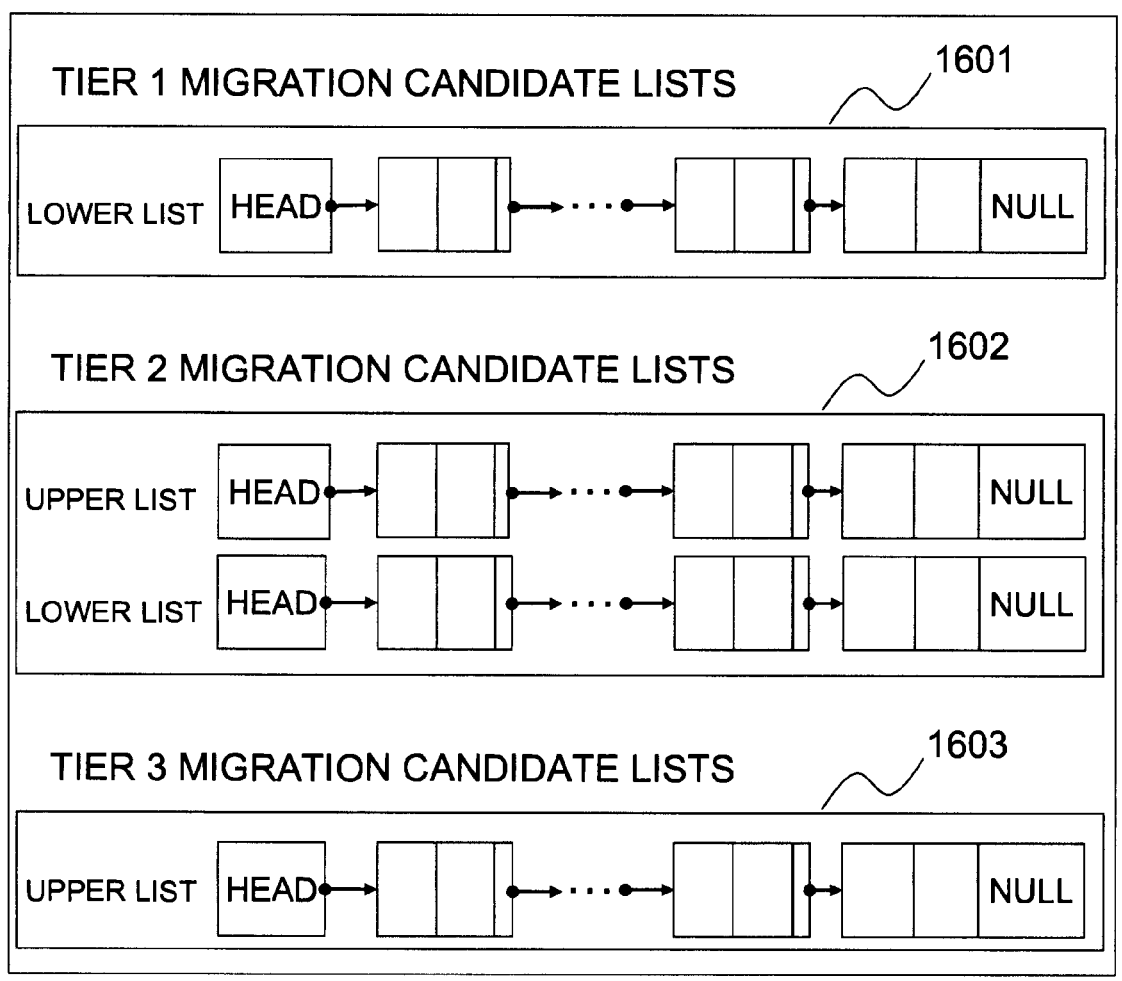
FIG. 16 is a diagram showing the structure of migration candidate lists related to a second embodiment.

FIG. 16 shows an example of the structure of the migration candidate lists 306 stored in the memory 300 of the file sharing server 100 in the second embodiment.

Migration candidate lists 306 are prepared for each Tier. The migration candidate lists 306 of each Tier are configured from an upper list and a lower list. The upper list is a list of candidate files to be migrated from the present Tier to the upper Tier. By contrast, the lower list is a list of candidate files to be migrated from the present Tier to the lower Tier. Furthermore, the migration candidate lists 306 of the highest Tier are configured only from lower lists; there are no upper lists. Also, the migration candidate lists 306 of the lowest Tier are configured only from upper lists; there are no lower lists.

These migration candidate lists 306 are constructed in accordance with a migration candidate lists construction cycle set by the administrator. At this time, all the files stored in the file systems 202x of all the Tiers are scanned. A file that has an access count value that is larger than the administrator-set threshold for the number of accesses of an upper Tier migration is inserted in the upper list. Also, a file that has an access count value that is smaller than the administrator-set threshold for the number of accesses of a lower Tier migration is inserted in the lower list. The entries of the upper list are sorted from the head in order from the entry with the largest access count 502 value. The entries of the lower list are sorted from the head in order from the entry with the smallest access count 502 value.

In this embodiment, the maximum number of entries for the upper list and lower list is an integral multiple of the number of migration files set by the administrator. The value of this integral multiple is the value obtained by dividing the administrator-set migration candidate lists construction cycle by the file migration cycle. Consequently, entries for which file migration is not carried out are not stored in the migration candidate list, making it possible to prevent a useless file migration.

Migration file lists 201 are separated from the migration candidate lists 306 each time the below-explained file migration process is executed. Further, once the migration candidate lists 306 have been created, the next and subsequent separation of the migration file lists 201 is carried out from the created migration candidate lists 306. This is because the reuse of the migration candidate lists 306 like this shortens the migration candidate lists construction process that scans all the files stored in the file systems of all the Tiers, reducing the impact this process has on the system.

Figure 17:
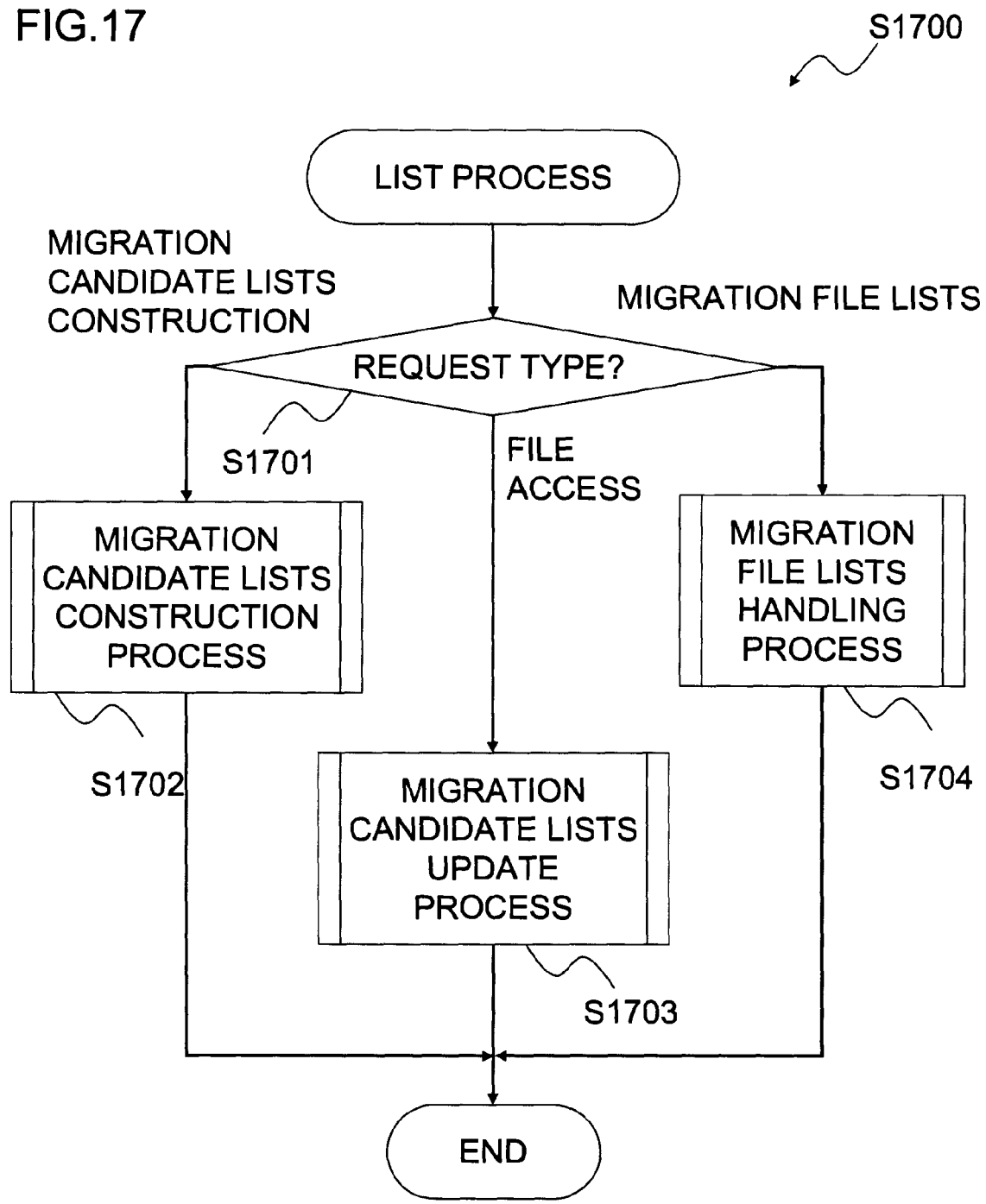
FIG. 17 is a flowchart showing a list process in accordance with a list processing section related to the second embodiment.

FIG. 17 is a flowchart showing the list process in accordance with the list processing section 305. In the list process, either a migration candidate lists 306 construction process, a migration candidate lists 306 update process or a migration file lists 201 handling process is carried out. The migration candidate lists 306 construction process is invoked by the OS in accordance with the administrator-set migration candidate lists construction cycle, and the migration file lists 201 handling process is invoked from the file migration control section 302 in accordance with the administrator-set file migration cycle. The migration candidate lists 306 update process is invoked from the HSM management section 307 each time a file is accessed.

The process shown in FIG. 17 will be explained below in accordance with the step numbers.

(Step S1701) The list processing section 305 determines the type of request that has been invoked.

(Step S1702) In a case where the type of request invoked is a migration candidate lists construction request from the OS (Step S1701: migration candidate list construction), the list processing section 305 carries out the below-described migration candidate lists construction process and ends the list process.

(Step S1703) In a case where the type of request invoked is a file access request from the HSM management section 307 (Step S1701: file access), the list processing section 305 carries out the below-described migration candidate lists update process and ends the list process.

(Step S1704) In a case where the type of request invoked is a migration file lists request from the file migration control section 302 (Step S1701: migration file lists), the list processing section 305 carries out the below-described migration file lists handling process and ends the list process.

Figure 18:
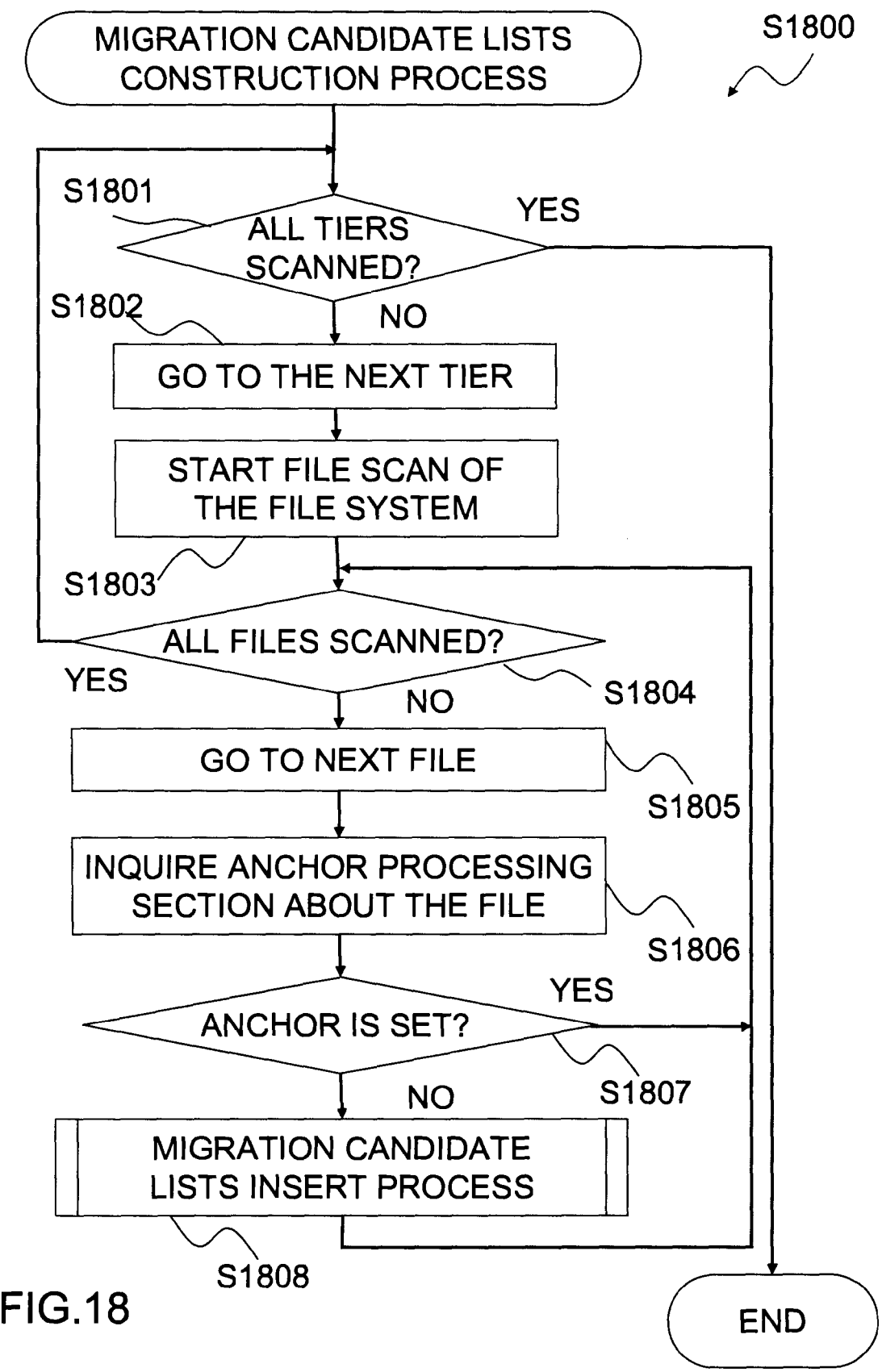
FIG. 18 is a flowchart showing a migration candidate lists construction process in accordance with the list processing section related to the second embodiment.

FIG. 18 is a flowchart showing the migration candidate lists construction process in accordance with the list processing section 305. The migration candidate lists construction process is the process of Step S1702 of FIG. 17, and scans all the files stored in the file systems 202x of all the Tiers, and creates migration candidate lists for each Tier.

The process shown in FIG. 18 will be explained below in accordance with the step numbers.

(Step S1801) The list processing section 305 determines whether or not the migration candidate lists construction process has been completed for all the Tiers. In a case where the migration candidate lists construction process has been completed for all the Tiers (Step S1801: YES), the list process ends.

(Step S1802) By contrast, in a case where the migration candidate lists construction process has not been completed for all the Tiers (Step 1801: NO), the list processing section 305 moves the migration candidate lists construction process to the next Tier.

(Step S1803) The list processing section 305 starts the scan of all the files in the file system 202x of the Tier currently being processed.

(Step S1804) The list processing section 305 determines whether or not all the files of the file system 202x currently being processed have been scanned. In a case where the scan of all the files has been completed (Step 1804: YES), the list processing section 305 moves to Step S1801.

(Step S1805) In a case where the scan of all the files has not been completed (Step 1804: NO), the list processing section 305 proceeds to the next file.

(Step S1806) The list processing section 305 queries the anchor processing section 303 as to whether or not an anchor has been set to this file.

(Step S1807) In a case where an anchor has been set to the file (Step S1807: YES), the list processing section 305 moves to Step S1804.

(Step S1808) Conversely, in a case where an anchor has not been set to the file (Step S1807: NO), the list processing section 305 carries out the below-described migration candidate lists insert process and moves to Step S1804.

Furthermore, it is possible to lessen the impact of the migration candidate lists construction process on the system by linking to a backup process and carrying out the migration candidate lists construction process at the same time as the files of the file system are being scanned by the backup process.

Figure 19:
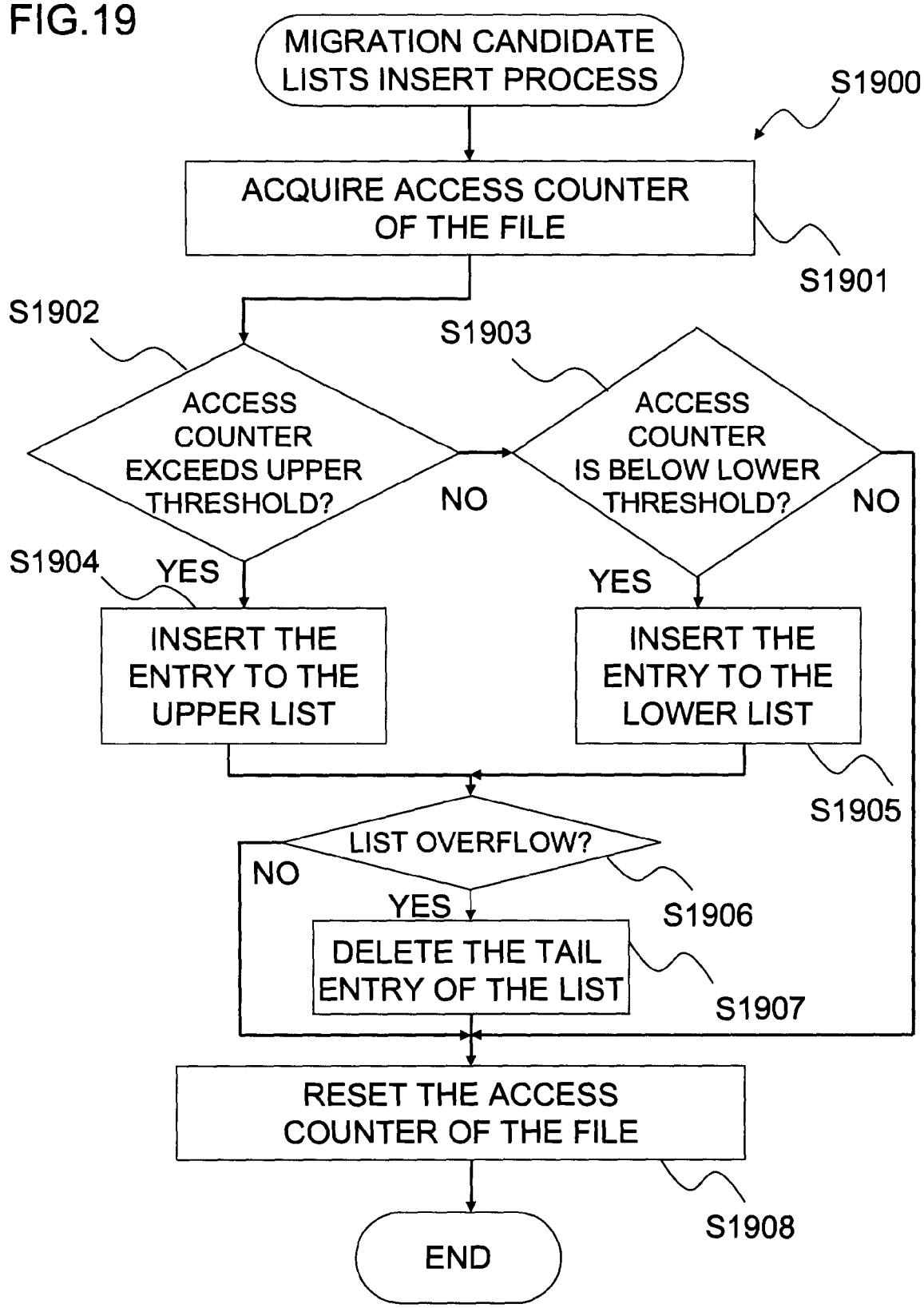
FIG. 19 is a flowchart showing the migration candidate lists insert process in accordance with the list processing section related to the second embodiment.

FIG. 19 is a flowchart showing the migration candidate lists insert process in accordance with the list processing section 305. The migration candidate lists insert process is the process of Step S1808 of FIG. 18, and references the access-counter value of the process-targeted file and inserts an entry into the migration candidate lists 306 when a policy is met.

Hereinafter, inside the migration candidate lists 306 of each Tier, the list of candidates for a migration from the upper Tier to the lower Tier will be called the lower list, and the list of candidates for a migration from the lower Tier to the upper Tier will be called the upper list.

The process shown in FIG. 19 will be explained below in accordance with the step numbers.

(Step S1901) The list processing section 305 acquires the access-counter value of this file from the file meta-information held by the HSM file system 200.

(Step S1902) The list processing section 305 compares the access-counter value acquired in S1901 against a set upper threshold.

(Step S1903) In a case where the access-counter value of this file exceeds the set upper threshold (Step S1902: YES), the list processing section 305 inserts the entry of this file into the upper list. The values of the access counter 502 of the upper list are inserted at this time so as to line up in order from the largest value. The list processing section 305 moves to Step S1906.

(Step S1904) Conversely, in a case where the access-counter value of this file is less than the set upper threshold (Step S1902: NO), the list processing section 305 compares the access-counter value of this file against a lower threshold. In a case where the access-counter value of this file exceeds the set lower threshold (Step S1904: NO), the list processing section 305 moves to Step S1908.

(Step S1905) Conversely, in a case where the access-counter value of this file is below the set lower threshold (Step S1904: YES), the list processing section 305 inserts the entry of this file into the lower list. The values of the access counter 502 of the lower list are inserted at this time so as to line up from the head in order from the smallest value. The list processing section 305 moves to Step S1906.

(Step S1906) The list processing section 305 determines whether or not the list is overflowing. When the list is not overflowing (Step S1906: NO), the list processing section 305 moves to Step S1908.

(Step S1907) By contrast, when the list is overflowing (Step S1906: YES), the list processing section 305 deletes the tail entry of this list.

(Step S1908) The list processing section 305 requests the HSM management section 307 to reset the access-counter value of this file, and the HSM management section 307 resets to access-counter value of this file and ends the migration candidate lists insert process.

Figure 20:
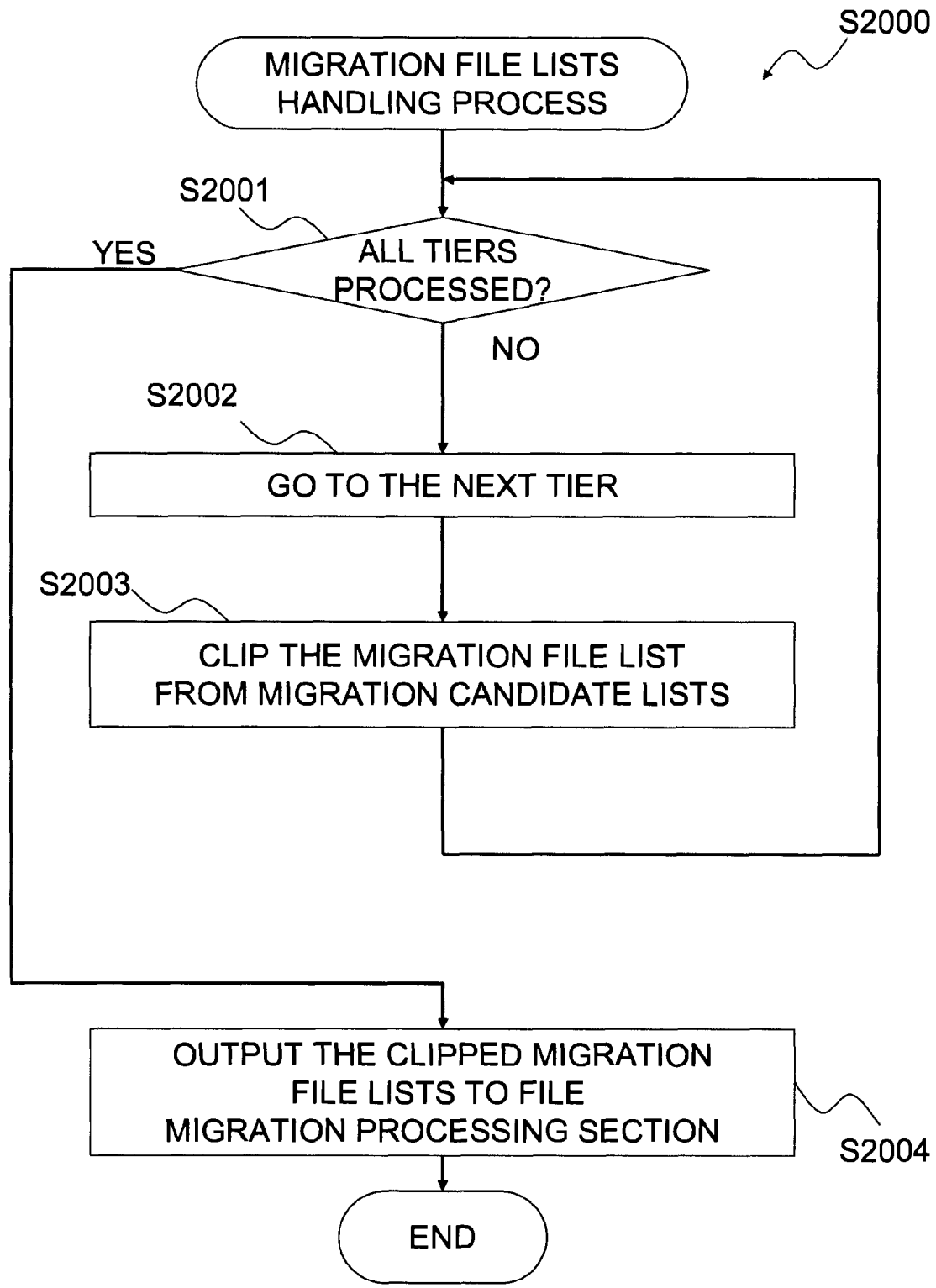
FIG. 20 is a flowchart showing a migration file lists handling process in accordance with the list processing section related to the second embodiment.

FIG. 20 is a flowchart showing the migration file lists handling process in accordance with the list processing section 305. The migration file lists handling process is the processing of Step S1704 of FIG. 17, and is a process for creating migration file lists 201 from the migration candidate lists 306 of each Tier, and delivering these file lists 201 to the file migration control section 302.

(Step S2001) The list processing section 305 determines whether or not the migration file lists handling process has been completed for all the Tiers. In a case where the migration file lists handling process has been completed for all the Tiers (Step S2001: YES), the list processing section 305 moves to Step S2004.

(Step S2002) Conversely, in a case where the migration file lists handling process has not been completed for all the Tiers (Step S2001: NO), the list processing section 305 moves the migration file lists handling process to the next Tier.

(Step S2003) The list processing section 305 clips the entries of the number of migration files set by the administrator from the migration candidate lists 306 of the Tier currently being processed, and creates migration file lists 201. The list processing section 305 moves to Step S2001.

(Step S2004) The list processing section 305 delivers the created migration file lists 201 of all the Tiers to the file migration control section 302, and ends the series of migration file lists handing processes.

In the processing of Step S2003 of FIG. 20, in a case where the number of entries of the upper list or lower list of the migration candidate lists 306 being processed does not satisfy the number of migration files set by the administrator, the list processing section 305 creates migration file lists 201 comprising all the entries of the upper list or lower list of the migration candidate lists 306. In a case where the upper list or lower list of the migration candidate lists 306 being processed is NULL, the list processing section 305 creates a NULL migration file list 201.

FIG. 21 is a flowchart showing the file migration process in accordance with the file migration control section 302. The file migration process is invoked by the OS in accordance with the file migration cycle and timing set by the administrator, and carries out inter-tier file migration based on the migration file lists 201 acquired from the list processing section 305. Hereinafter, within the migration file lists 201, a migration file list that migrates from the upper Tier to the lower Tier will be called a lower migration list, and a migration file list that migrates from the lower Tier to the upper Tier will be called an upper migration list.

(Step S2101) The file migration control section 302 requests and receives the migration file lists 201 from the list processing section 305.

(Step S2102) The file migration control section 302 determines whether or not the file migration process has been completed for all the migration file lists 201. In a case where the file migration process has been completed for all the migration file lists 201 (Step S2101: YES), the file migration process ends.

(Step S2103) Conversely, in a case where the file migration process has not been completed for all the migration file lists 201 (Step S2102: NO), the file migration control section 302 moves the file migration process to the next migration file lists 201.

(Step S2104) The file migration control section 302 determines whether or not the migration file list 201 currently being processing is NULL. In a case where the migration file list 201 currently being processed is NULL (Step S2104: YES), the file migration control section 302 moves to Step S2102.

(Step S2105) Conversely, in a case where the migration file list 201 currently being processed is not NULL (Step S2104: NO), the file migration control section 302 migrates the file of the head entry of the migration file list 201. At this time, if the migration file list 201 currently being processed is the upper migration list, the file is migrated to the upper Tier, and if the migration file list 201 currently being processed is the lower migration list, the file is migrated to the lower Tier.

(Step S2106) The file migration control section 302 deletes the head entry of the migration file list 201, and moves to Step S2104.

FIG. 22 is a flowchart showing the migration candidate lists update process in accordance with the list processing section 305. The migration candidate lists update process is the processing of Step S1703 of FIG. 17, and increments the access counter of the accessed file and inserts the entry of this file into the upper list in cases where the value of this access counter exceeds the administrator-set threshold for immediately inserting the entry into the migration candidate lists 306, and this file entry is not stored in the construction-complete migration candidate lists 306 (upper list). The migration candidate lists 306 immediate entry insertion threshold is set from the settings screen 800 by the administrator. Furthermore, the migration candidate lists 306 immediate entry insertion threshold must be larger than the upper threshold used in Step S1902 of FIG. 19. In a case where a setting that does not satisfy this policy has been set, a warning is issued and a reset requested. Also, in a case where a file whose entry is stored in a construction-complete lower list is accessed, this entry is deleted from the lower list.

(Step S2201) The list processing section 305 requests the HSM management section 307 to increment the value of the access counter of the accessed file, and the HSM management section 307 increments the access-counter value of this file.

(Step S2202) The list processing section 305 acquires the access-counter value of this file from the file meta-information held by the HSM file system 200.

(Step S2203) The list processing section 305 determines whether or not the access-counter value of this file is 1.

(Step S2204) In a case where the access-counter value of this file is not 1 (Step S2203: NO), the list processing section 305 determines whether or not this file access-counter value exceeds the set immediate entry insertion threshold. In a case where this file access-counter value does not exceed the set immediate entry insertion threshold (Step S2204: NO), the migration candidate lists update process ends.

(Step S2205) In a case where this file access-counter value does exceed the set immediate entry insertion threshold (Step S2204: YES), the list processing section 305 determines whether or not the entry of this file is stored in the upper list. In a case where the entry of this file is stored in the upper list (Step S2205: YES), the migration candidate lists update process ends.

(Step S2206) By contrast, in a case where the entry of this file is not stored in the upper list (Step S2205: NO), the list processing section 305 inserts the entry of this file into upper list.

(Step S2207) The list processing section 305 determines whether or not the list is overflowing. In a case where the list is not overflowing (Step S2207: NO), the migration candidate lists update process ends.

(Step S2208) Conversely, in a case where the list is overflowing (Step S2207: YES), the list processing section 305 deletes the tail entry of this list and ends the migration candidate lists update process.

(Step S2209) In a case where the access-counter value of this file is 1 (Step S2203: YES), the list processing section 305 determines whether or not the entry of this file is stored in the lower list. In a case where this file entry is not stored in the lower list (Step S2209: NO), the migration candidate lists update process ends.

(Step S2210) Conversely, in a case where this file entry is stored in the lower list (Step S2209: YES), the list processing section 305 deletes this file entry from the lower list, and ends the migration candidate lists update process.

According to the migration candidate lists update process of FIG. 22, it is possible to reflect the access frequency of a file that is accessed after the migration candidate lists 306 have been constructed in the migration candidate lists 306 without carrying out a migration candidate lists handling process.

Furthermore, this embodiment carries out the processing of Step S2210 for each entry, but entries that should be deleted may be recorded and a plurality of entries may be deleted collectively.

In this embodiment, the access-counter value, which is held as file meta-information, is reset at the time of a migration candidate lists construction process. Therefore, an inter-tier file migration is carried out based on a file access generated during the administrator-set migration candidate lists construction cycle. As another example, an inter-tier file migration may be carried out based on the access frequency subsequent to file creation. In accordance with this, a method by which the access counter is simply incremented each time a file is accessed will not enable a distinction to be made between a recent file access and a past file access, making in impossible to carry out an inter-tier file migration in conformance to the recent utilization state. By contrast, it is possible to use an access-counter update method by which the file access of this time is added to the access counter after reducing the cumulative value of the access counter by a portion that is proportional to the elapsed time from the last access time to the present. Consequently, the value added to the access counter in accordance with a recent file access can be made larger, and the value added to the access counter in accordance with a past file access can be made smaller.

In this embodiment, the migration candidate lists 306 are created based solely on the access-counter value that serves as the file access frequency, but, for example, it is possible to use an access frequency evaluation value like the following. At this time, the file access frequency is defined by the access frequency evaluation value depicted in the below-described Numerical Formula 1.

Access frequency evaluation value=
$AC \times N + ET \times (1-N)$  (Numerical Formula 1)

The AC of Numerical Formula 1 is the access-counter value of the file meta-information. The ET in Numerical Formula 1 is the elapsed time from the last access time of the file to the present. The N in the Numerical Formula 1 is the weight coefficient of the range from 0 to 1. Since the units of the AC and ET of Numerical Formula 1 differ, they must be normalized. Consequently, it is possible to migrate a file that has a shorter elapsed time from the last access time to the present to the upper Tier, and a file that has a longer elapsed time from the last access time to the present to the lower Tier even for files that have the same number of accesses. Furthermore, in addition to the access-counter value and the elapsed time from the last access time to the present, the file size may also be added to the evaluation value. These elements may be acquired from the file meta-information.

As explained hereinabove, the second embodiment maintains migration candidate lists 306 for each Tier, and file migration is carried out in accordance with the administrator-set file migration cycle with files that are accessed frequently being migrated from the lower Tier to the upper Tier, and files that are accessed infrequently being migrated from the upper Tier to the lower Tier. Consequently, the migration of files from the upper Tier to the lower Tier is carried out regularly in conformance the access frequency. Also, since migration candidate lists 306 are not created at the time of a file access, there is less processing at the time of a file access than in the first embodiment. In the process for constructing the migration candidate lists 306, the second embodiment uses the migration candidate lists 306 that have been constructed one time in a plurality of file migrations, reducing the impact of the migration candidate lists 306 construction process on the system. In addition, it is also possible to lessen the impact of the migration candidate lists 306 construction process on the system by constructing the migration candidate lists 306 when all the files of the file system are being scanned in accordance with the backup process.

According to the above explanation, in the present invention, migration candidate lists 306 are maintained based on the access frequency of each Tier, and inter-tier file migration is carried out based on migration file lists 201 created therefrom. In the prior art, a file that has been accessed even one time is migrated to the upper Tier. In the present invention, a file that is accessed with high frequency is migrated to the upper Tier, making it possible to carry out inter-tier file migration that conforms to the utilization state. Further, in the prior art, the response time for an inter-tier file migration to be carried out when there is an access is a problem, but the present invention makes it possible to solve for the problem of the prior art since file migrations are carried out collectively based on regularly created file migration lists 201. The impact of inter-tier file migrations on the system can also be reduced by carrying out the migrations at a time when the load on the system is low, such as in the middle of the night.

What is claimed is:

1. A file sharing server, which comprises at least one computer and is connected to a plurality of storage devices, the server comprising:
    a storage management section; and
    a file migration control section,
    wherein the storage management section is configured to
        arrange the plurality of storage devices into a hierarchy of tiers,
        manage each of the hierarchized tiers by assigning thereto a corresponding priority in accordance with either characteristics or performance of the plurality of storage devices,
        create for each of the hierarchized tiers a first and second list of files that are migration candidates, each of the lists including a plurality of entries which respectively contain an ID and access count of a file, when a maximum number of the entries for each of the lists is predetermined;
        in response to an I/O request to a file in one of the hierarchized tiers from the computer,
            when the file is not in the lists for the tier, add an entry of the file to the first list for the tier, and then when the first list to which the entry added is overflowing, delete an entry of a file which is the least recently accessed from the overflowing first list; and
            when the file is in the first list for the tier, increment the access count of the file, and then when the incremented access count exceeds a predetermined threshold of the first list, move the entry of the accessed file to the second list,
    wherein the file migration control section is configured to migrate the files on the second list concurrently to a tier higher in the hierarchy at a determined timing; and
    wherein the storage management section is configured to delete the migrated files from the list.

2. The server according to claim 1, further comprising an anchor processing section, wherein the anchor processing section has information that specifies a file for which migration is prohibited, the file migration control section references the anchor processing section prior to migrating the file, and in a case where the file targeted for migration is the migration-prohibited file, does not migrate the file.

3. The server according to claim 2, wherein, with respect to the information that specifies the migration-prohibited file, the anchor processing section also has information on expiration time for the migration-prohibited file, and the file migration control section references the anchor processing section prior to migrating the file, and in a case where the file targeted for migration is the migration-prohibited file and the expiration time has elapsed, handles the file as a migration-targeted file.

4. The server according to claim 1, wherein the file migration of the file migration control section is carried out at a predetermined interval.

5. The server according to claim 4, wherein the file migration of the file migration control section is triggered when a free capacity of the one of the respective hierarchized tiers falls to or below a threshold.

6. The server according to claim 1, wherein the migration candidate files, which have been clipped for each of the respective hierarchized tiers, is managed in a list.

7. The server according to claim 6, wherein an access frequency of a file in the list of migration candidate files clipped for each of the respective hierarchized tiers is equal to or larger than a threshold.

8. The server according to claim 6, wherein the list of migration candidate files clipped for each of the respective hierarchized tiers is updated when a file of each of the plurality of storage devices is accessed.

9. The server according to claim 6, wherein an updating of the list of migration candidate files clipped for each of the respective hierarchized tiers is triggered when a backup of the plurality of storage devices is carried out.

10. The server according to claim 6, wherein a number of files to be migrated is predetermined, and
    a number of entries of the list of migration candidate files clipped for each of the respective hierarchized tiers is an integral multiple of the predetermined number of files to be migrated.

11. The server according to claim 6, wherein the list of migration candidate files clipped for each of the respective hierarchized tiers is managed as first files, which are candidates for migration from the tier having these files to a high priority tier, and as second files, which are candidates for migration from the tier having these files to a low priority tier.

12. The server according to claim 11, wherein the first files and the second files are updated from the list of migration candidate files clipped for each of the respective hierarchized tiers at a predetermined interval based on a predetermined threshold.

13. The file sharing server according to claim 6, wherein the storage management section does not add to the list a file which is prohibited to be migrated.

14. The file sharing server according to claim 13, wherein if the access count of a file exceeds a second threshold, the storage management section migrates the file to an upper tier independently from the migration of the files on the list of the tier corresponding to the file to be migrated.

15. A method of migrating files, the method comprising:
    arranging, using at least one computer, a plurality of storage devices into a hierarchy of tiers,
    managing, using the at least one computer, each of the hierarchized tiers by assigning thereto a corresponding priority in accordance with either characteristics or performance of the plurality of storage devices,
    creating, using the at least one computer, for each of the hierarchized tiers a first and second list of files that are migration candidates, each of the lists including a plurality of entries which respectively contain an ID and access count of a file, wherein a maximum number of the entries for each of the lists is predetermined;
    in response to an I/O request to a file in one of the hierarchized tiers from the computer,
        when the file is not in the lists for the tier, adding, using the at least one computer, an entry of the file to the first list for the tier, and then when the first list to which the entry added is overflowing, deleting, using the at least one computer, an entry of a file which is the least recently accessed from the overflowing first list; and
        when the file is in the first list for the tier, incrementing, using the at least one computer, the access count of the file, and then when the incremented access count exceeds a predetermined threshold of the first list, moving, using the at least one computer, the entry of the accessed file to the second list,
    migrating, using the at least one computer, the files on the second list concurrently to a tier higher in the hierarchy at a determined timing; and deleting, using the one or more computer, the migrated files from the list.

16. The method of claim 15, wherein the arranging is carried out by a storage management section of a file sharing server.

17. The method of claim 15, wherein the migrating is carried out by a file migration control section of a file sharing server.

18. The method of claim 15, wherein the deleting is carried out by the storage management section of a file sharing server.

19. The method of claim 15, wherein a file, which is prohibited to be migrated, is not added to the list.

20. The method of claim 19, further comprising, if the access count of a file exceeds a second threshold, migrating the file to an upper tier independently from the migration of the files on the list of the tier corresponding to the file to be migrated.

* * * * *